US008208649B2

(12) United States Patent
Fozunbal et al.

(10) Patent No.: US 8,208,649 B2
(45) Date of Patent: Jun. 26, 2012

(54) METHODS AND SYSTEMS FOR ROBUST APPROXIMATIONS OF IMPULSE RESPONSES IN MULTICHANNEL AUDIO-COMMUNICATION SYSTEMS

(75) Inventors: Majid Fozunbal, Mountain View, CA (US); Ton Kalker, Carmel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 474 days.

(21) Appl. No.: 12/387,075

(22) Filed: Apr. 28, 2009

(65) Prior Publication Data

US 2010/0272274 A1  Oct. 28, 2010

(51) Int. Cl.
  H04B 15/00   (2006.01)
  H04R 3/00   (2006.01)
  H04R 27/00   (2006.01)
  H03F 99/00   (2009.01)
(52) U.S. Cl. ...................................... 381/71.1
(58) Field of Classification Search ................... 381/71.1
  See application file for complete search history.

(56) References Cited

U.S. PATENT DOCUMENTS

| 5,657,384 | A  | * | 8/1997  | Staudacher et al. | ..... 379/406.08 |
| 5,828,756 | A  | * | 10/1998 | Benesty et al. | ................ 381/66 |
| 6,137,881 | A  | * | 10/2000 | Oh et al. | ................. 379/406.08 |
| 6,553,122 | B1 | * | 4/2003  | Shimauchi et al. | ............ 381/66 |
| 6,873,704 | B1 | * | 3/2005  | Park | ......................... 379/406.08 |
| 7,333,605 | B1 | * | 2/2008  | Zhang et al. | ............. 379/406.08 |
| 7,660,425 | B1 | * | 2/2010  | Reed et al. | ...................... 381/66 |
| 7,720,233 | B2 | * | 5/2010  | Sato et al. | ................... 381/71.11 |
| 7,813,497 | B2 | * | 10/2010 | Brox | ........................ 379/406.08 |
| 7,813,499 | B2 | * | 10/2010 | Chhetri et al. | ........... 379/406.14 |
| 7,856,097 | B2 | * | 12/2010 | Tokuda | ..................... 379/406.05 |
| 7,903,137 | B2 | * | 3/2011  | Oxford et al. | ............. 348/14.01 |
| 7,925,007 | B2 | * | 4/2011  | Stokes et al. | ............. 379/406.08 |
| 7,995,767 | B2 | * | 8/2011  | Amada | ........................... 381/18 |
| 8,045,730 | B1 | * | 10/2011 | Fozunbal et al. | ............... 381/93 |
| 2006/0002546 | A1 | * | 1/2006  | Stokes et al. | ............. 379/406.06 |
| 2006/0269074 | A1 | * | 11/2006 | Oxford | ............................ 381/59 |
| 2007/0253565 | A1 | * | 11/2007 | Fozunbal | ........................ 381/66 |
| 2008/0091415 | A1 | * | 4/2008  | Schafer | ...................... 704/200.1 |
| 2008/0175394 | A1 | * | 7/2008  | Goodwin | .......................... 381/1 |
| 2008/0208538 | A1 | * | 8/2008  | Visser et al. | .................. 702/190 |
| 2008/0232577 | A1 | * | 9/2008  | Raifel et al. | .............. 379/406.01 |
| 2008/0267420 | A1 | * | 10/2008 | Fozunbal | ........................ 381/66 |
| 2009/0316923 | A1 | * | 12/2009 | Tashev et al. | .................... 381/66 |
| 2010/0272274 | A1 | * | 10/2010 | Fozunbal et al. | ............. 381/71.1 |

* cited by examiner

Primary Examiner — Jeffrey Donels
Assistant Examiner — Robert W Horn

(57) ABSTRACT

Proper estimation of impulse responses is an important and challenging aspect of multichannel echo control. Various embodiments of the present invention are directed to real-time, adaptive acoustic echo cancellation methods in multi-channel audio-communication systems. In particular, embodiments of the present invention use a collection of a room's past impulse responses to determine an optimal lower dimensional impulse response space as the underlying search subspace for approximate impulse responses. As a result, embodiments of the present invention mitigate inherent instability of multichannel audio-communication systems and provide stable and accurate echo removal without distorting audio signals.

20 Claims, 23 Drawing Sheets

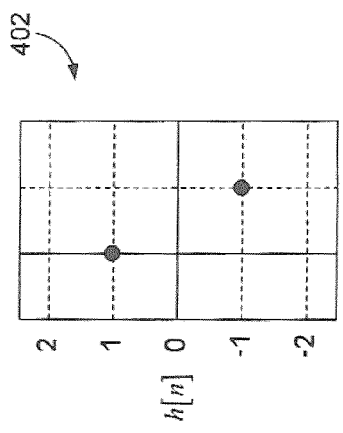
Figure 4A
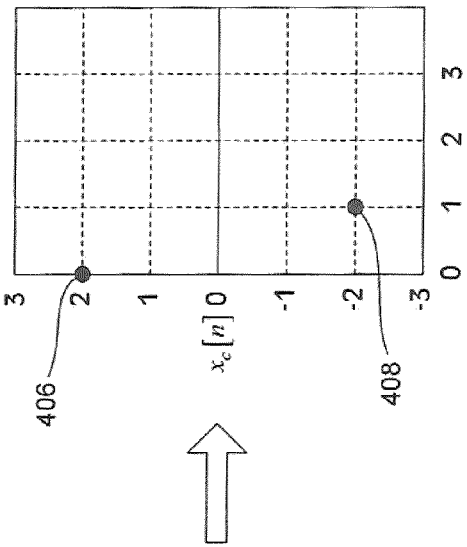
Figure 4B
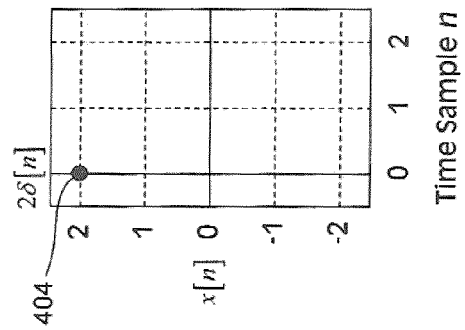

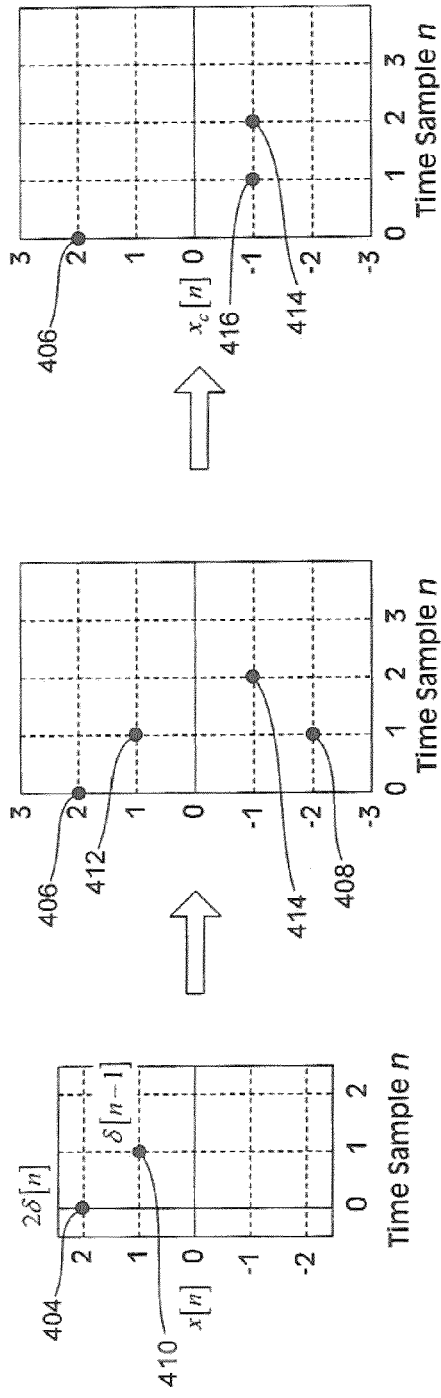
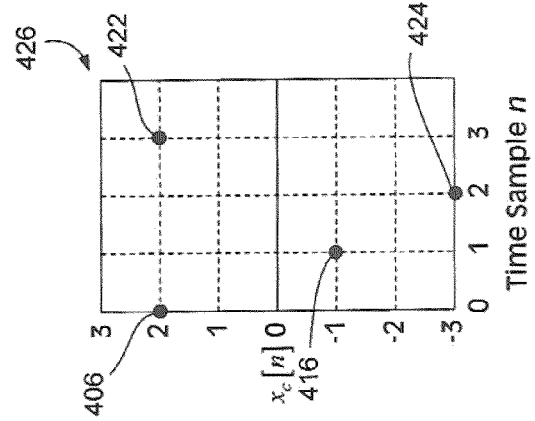
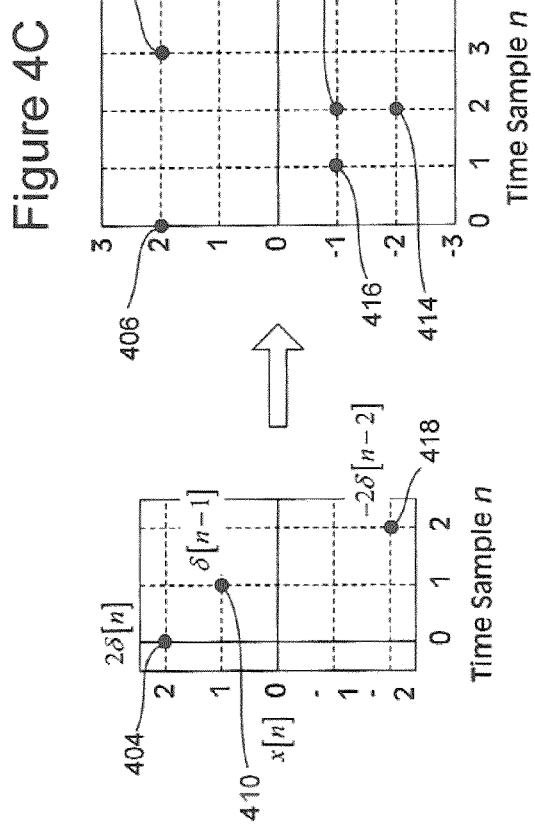
Figure 4C
Figure 4D

METHODS AND SYSTEMS FOR ROBUST APPROXIMATIONS OF IMPULSE RESPONSES IN MULTICHANNEL AUDIO-COMMUNICATION SYSTEMS

TECHNICAL FIELD

The present invention is related to acoustic echo cancellation, and, in particular, to methods and systems for reducing acoustic echoes in multichannel audio-communication systems.

BACKGROUND

Increasing interest in communication media, such as the Internet, electronic presentations, voice mail, and audio-conference communication systems, is increasing the demand for high-fidelity audio and communication technologies. Currently, individuals and businesses are using these communication media to increase efficiency and productivity, while decreasing cost and complexity. For example, audio-conference communication systems allow one or more individuals at a first location to simultaneously converse with one or more individuals at other locations through full-duplex communication lines in nearly real time, without wearing headsets or using handheld communication devices.

In many audio-conference communication systems, audio signals carry a large amount of data, and employ a broad range of frequencies. Modern audio-conference communication systems attempt to provide clear transmission of audio signals over a single channel, also called a "monochannel," free from perceivable distortion, background noise, and other undesired audio artifacts. One common type of undesired audio artifact is an acoustic echo. Acoustic echoes can occur when a transmitted audio signal loops through an audio-conference communication system due to the coupling of a microphone and a speaker at a location. FIG. 1 shows a schematic diagram of an exemplary, two-location, monochannel audio-conference communication system 100. The audio-conference communication system 100 includes a near room 102 and a far room 104. Sounds, such as voices, produced in the near room 102 are detected by a microphone 106, and sounds produced in the far room 104 are detected by a microphone 108. Microphones 106 and 108 convert sounds into signals represented by x(t) and y(t), respectively, where t represents time.

The microphone 106 can detect many different sounds produced in the near room 102, including sounds output by a loudspeaker 114. An analog signal produced by the microphone 106 is represented by:

$$y(t)=s(t)+e(x(t))+v(t)$$

where s(t) is an analog signal representing sounds produced in the near room 102, v(t) is an analog signal representing noise, or extraneous signals created by disturbances in the microphone or communication channel 110, that, for example, may produce an annoying buzzing sound output from the loudspeaker 116, and e(x(t)) is an analog signal representing an acoustic echo. The acoustic echo e(x(t)) is due to both acoustic propagation delay in the near room 102 and a round-trip transmission delay of the analog signal x(t) over the communication channels 110 and 112. Sounds generated by the analog signal y(t) are output from a loudspeaker 116 in the far room 104. Depending on the amplification, or gain, in the amplitude of the signal y(t) and the magnitude of the acoustic echo e(x(t)), a person speaking into the microphone 108 in the far room 104 may hear, in addition to the sounds carried by the signal s(t), an echo or an annoying, high-pitched, howling sound emanating from the loudspeaker 116 as a result of the sound generated by the acoustic echo e(x(t)). Designers and manufacturers of audio-conference communication systems have attempted to compensate for acoustic echoes in various ways. One compensation technique employs a filtering system that reduces the acoustic echo. Typically, filtering systems employ adaptive filters that adapt to changing conditions at an audio-signal-receiving location.

In recent years there has been an increasing interest in developing multichannel audio communication systems in an effort to enhance the audio-conference experience. Multichannel systems employ a plurality of microphones and loudspeakers in the near and far rooms creating a plurality of acoustic echoes that are each separated by several hundred milliseconds of communication delay, which can be a significant obstacle to effectively deploying multichannel audio-conference communication systems. These methods typically approximate the plurality of echo paths by sending excitation signals to the speakers which produce impulse responses characterizing each of the echo paths in the room. These approximate impulse responses are convolved with the sent signals to produce approximate acoustic echoes that are subtracted from the return signals. A significant challenge in these multichannel systems is spatial correlation of the excitation signals sent to the loudspeakers to approximate the echo paths.

Multichannel echo control has been a challenging problem due to inherent instability caused in approximating echo path impulse responses. In particular, at any time, an acoustic echo cancellation system faces a situation where an infinite collection of candidate approximate impulse responses can be used to remove the echo. Among all these candidate approximate impulse responses, there is just one unique impulse response and a small percentage of good approximately impulse responses. The remaining approximate impulse responses result in an unstable impractical system. This phenomenon is known as the "non-uniqueness problem" and the challenge is how to identify good, approximate impulse responses.

A variety of algorithms have been developed to address the non-uniqueness problem. For example, designers and manufacturers have developed methods that employ nonlinear or time-variant functions to uncorrelate excitation signals prior to exciting the loudspeakers. However, these methods often lead to distortions of spatial and temporal attributes of the audio signals that ultimately diminish the spatial audio experience. Other methods attempt to approximate the space of echo paths by a finite number of set-theoretic constraints. In general, these methods do not distort the excitations signals, but they do not resolve the non-uniqueness problem, and as a result, these methods are slower to converge and have higher levels of residual echoes.

Although in recent years there have been a number of advances in multichannel communications, designers, manufacturers, and users of multichannel, audio-conference communication systems continue to seek enhancements that reliably remove acoustic echoes from audio signals in real-time and rapidly adapt to the changing conditions at audio-signal-receiving locations.

BRIEF DESCRIPTION OF THE DRAWINGS

FIGS. 4A-4D illustrate an example of determining a digital signal output from a microphone by convolving an input digital signal with the microphone impulse response.

DETAILED DESCRIPTION

Figure 1:
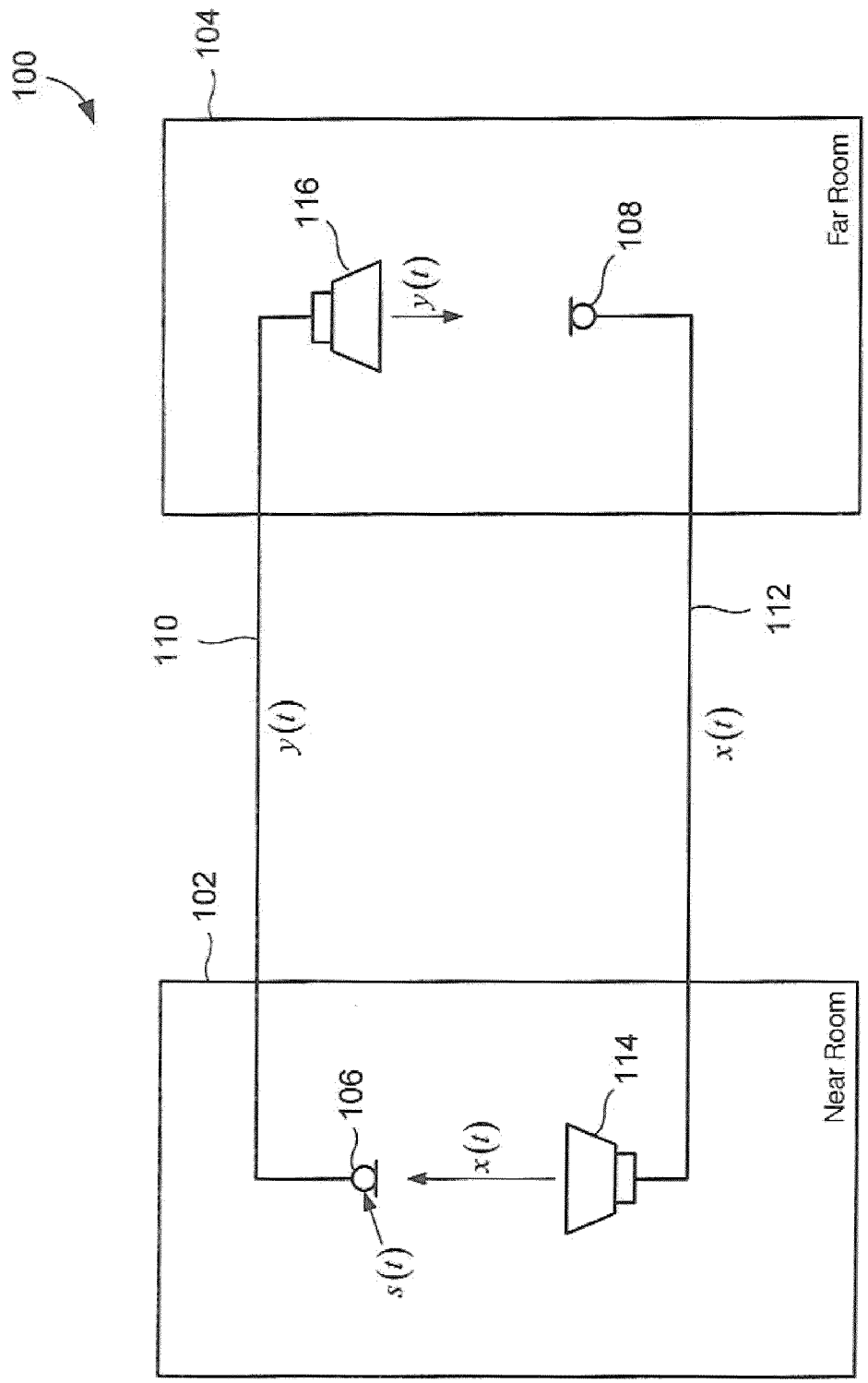
FIG. 1 shows a schematic diagram of an exemplary, two-location, audio-conference communication system.

Proper estimation of impulse responses is an important and challenging aspect of multichannel echo control. Various embodiments of the present invention are directed to real-time, adaptive acoustic echo cancellation methods in multichannel audio-communication systems. These methods reduce acoustic echoes in a plurality of audio signals transmitted between a first location and a second location over multichannel audio-communication systems. The communication systems can be electronic presentations, voice mail, audio-conference communication systems or any other type of communication system capable of transmitting audio signals between a first location and a second location. A plurality of microphones and loudspeakers are employed at the first location and the second location. Methods of the present invention are based on optimal reduction of the dimensionality of the search space of approximate impulse responses. In particular, methods of present invention balance the error of reducing the dimension of the search space from which approximate impulse responses, called "the approximation error," and the error caused by observation noise, called "the estimation error," as function of the reduction in dimension. The methods employ a collection of past approximations of the room impulse responses and infer an optional lower dimensional space as the under lying search subspace of the space of approximate impulse responses. The methods subtract the corresponding computed, approximate acoustic echoes from each of the digital signals that are transmitted from the second location to the first location and adjusts these signals for gain before the signals are output at the first location. As a result, methods of the present invention mitigate the inherent instability of a multichannel communication system by providing stable and accurate echo removal without distorting audio signals.

Embodiments of the present invention are mathematical in nature and, for this reason, are described below with reference to numerous equations and graphical illustrations. Although mathematical expressions, alone, may be sufficient to fully describe and characterize embodiments of the present invention to those skilled in the art of acoustic echo cancellation, the more graphical, problem oriented examples, and control-flow-diagram approaches included in the following discussion are intended to illustrate just one of many embodiments of the present invention so that the present invention may be accessible to readers with various backgrounds. In order to assist in understanding descriptions of various embodiments of the present invention, an overview of digital signals, impulse responses, and convolution is provided in a first subsection. Embodiments of the present invention are provided in a second subsection.

An Overview of Digital Signals, Impulse Responses, and Convolution

This subsection is intended to provide a general description of digital signals, impulse responses, and convolution in a monochannel audio transmission system. The concepts introduced in this subsection are then used to describe each of the audio channels in a multichannel acoustic echo embodiments described below in the next subsection. The term "microphone" refers to a transducer or any suitable device that converts sounds into signals. The "loudspeaker" refers to any suitable device capable of converting a signal into sound.

Sounds received by a microphone are transformed into an analog signal comprising a time-dependent, continuously varying voltage. In order to process an analog signal using a digital computer, the analog signal is first converted into a digital signal with minimal alteration of the essential information contained in the analog signal. Digital signals can be stored electronically, magnetically, or optically and can be processed using logical operations encoded in computer programs.

Figure 2A:
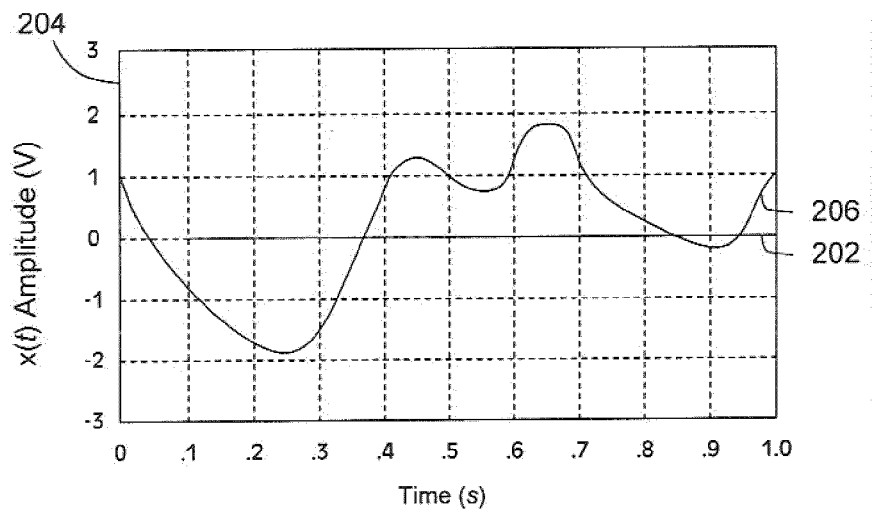
FIGS. 2A-2C illustrate conversion of an analog signal to a digital signal.
Figure 2B:
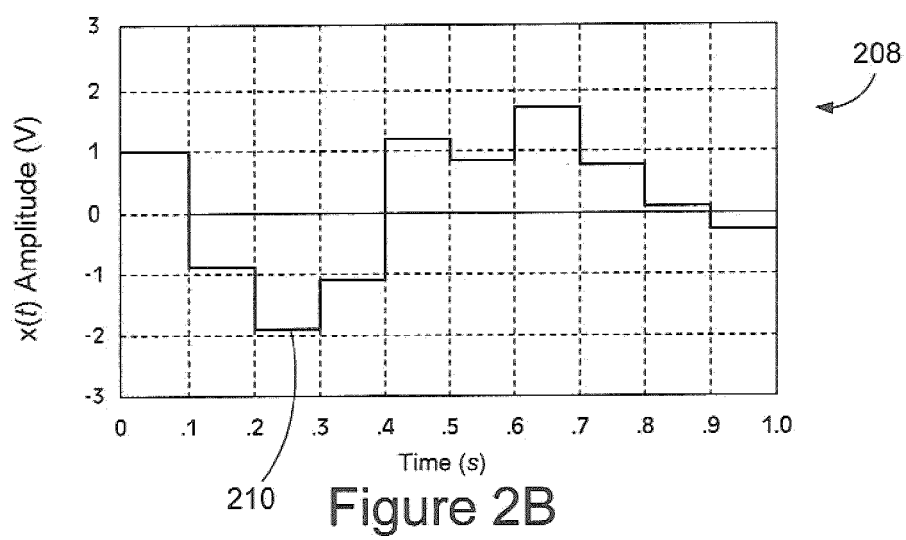
Figure 2C:
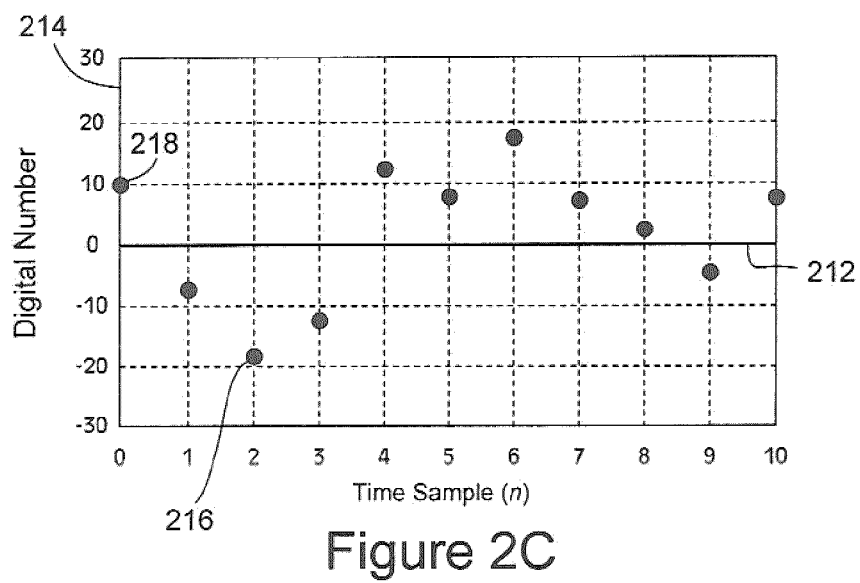

FIGS. 2A-2C illustrate conversion of an analog signal into a digital signal. In FIGS. 2A-2B, horizontal axes, such as horizontal axis 202, represent time, and vertical axes, such as vertical axis 204, represent analog signal amplitudes in volts. FIG. 2A is a plot of a time-dependent, continuously-varying analog signal x(t) 206. The analog signal x(t) 206 is first sampled by measuring the amplitude of the analog signal x(t) at discrete sampling times. In order to prevent loss of essential information contained in the analog signal, the duration between sampling times is generally selected to be sufficiently short so that the analog signal varies little between consecutive sampling times. FIG. 2B is a plot of a sampled signal 208 obtained by sampling the analog signal 206 in FIG. 2A. The sampling times are in tenths of a second, and the sampled signal 208 is approximated as a step function by assuming a constant-signal amplitude between sampling times. For example, a constant-amplitude region 210 represents a constant value of −1.9 volts between sampling times 0.2 and 0.3 seconds.

For efficient and convenient digital signal processing, it is desirable for both time and magnitude values to be integers. Therefore, an integer-encoded, digital signal is produced by multiplying the value of each constant-amplitude region by a first constant and by multiplying the sampling times by a second constant in order to produce integer values that represent the amplitude and sampling times of each step in the step function. An integer-valued sampling time is called a "time sample," and an integer-valued amplitude is called a "digital amplitude." The resulting digital signal can be functionally represented by x[n], where n, an independent variable, represents a time sample domain. FIG. 2C is a plot of a digital signal obtained from the sampled signal 208 in FIG. 2B. In FIG. 2C, horizontal axis 212 is a time sample domain, and vertical axis 214 is a digital signal axis. Each point in the graph represents a quantized value representing the scaled amplitude of the digital signal at a scaled sampling time. For example, point x[2] 216 with coordinates (2,−19) represents step 210 in FIG. 2B.

A digital signal x[n] can, in general, be thought of as a series of impulses, each impulse corresponding to a unique component. The notation x[n], where n represents a particular time sample, can also be used to represent a single impulse of a digital signal which is called a "component" of a digital signal. Each component is a signal comprising all zero sample values except for a single value representing the amplitude at a single time sample, which is mathematically represented by:

$$x[n] = d\delta[n-p]$$

where
d is an integer scale factor that represents the amplitude, or strength, of the impulse,
p is a time sample, and
δ is the delta function defined by:

$$\delta[n-p] = \begin{cases} 1 & \text{when } n = p \\ 0 & \text{otherwise} \end{cases}$$

For example, in FIG. 2C, the component x[0] 218 is equal to 10δ[p], and the component x[2] 216 is equal to −19δ[2−p]. In other words, p in the delta function δ[n−p] represents a time sample shift, and n−p represents a time sample relative to time sample n.

A digital impulse response, h[n], is a digital signal that is output from a microphone when the input to the microphone is a unit impulse δ[n], where p is "0" and d equals "1." The impulse response of a microphone can be determined by applying an impulse of sound with a very short duration to the microphone and measuring the signal output by the microphone. The impulse response of the microphone can also be represented by a vector as follows:

$$h[n] = \vec{h}_n = \begin{bmatrix} h_n[0] \\ h_n[1] \\ \vdots \\ h_n[L-1] \end{bmatrix}$$

where $h_n[\cdot]$ is an impulse response component, and
L is the number of components comprising the impulse response.

Figure 3:
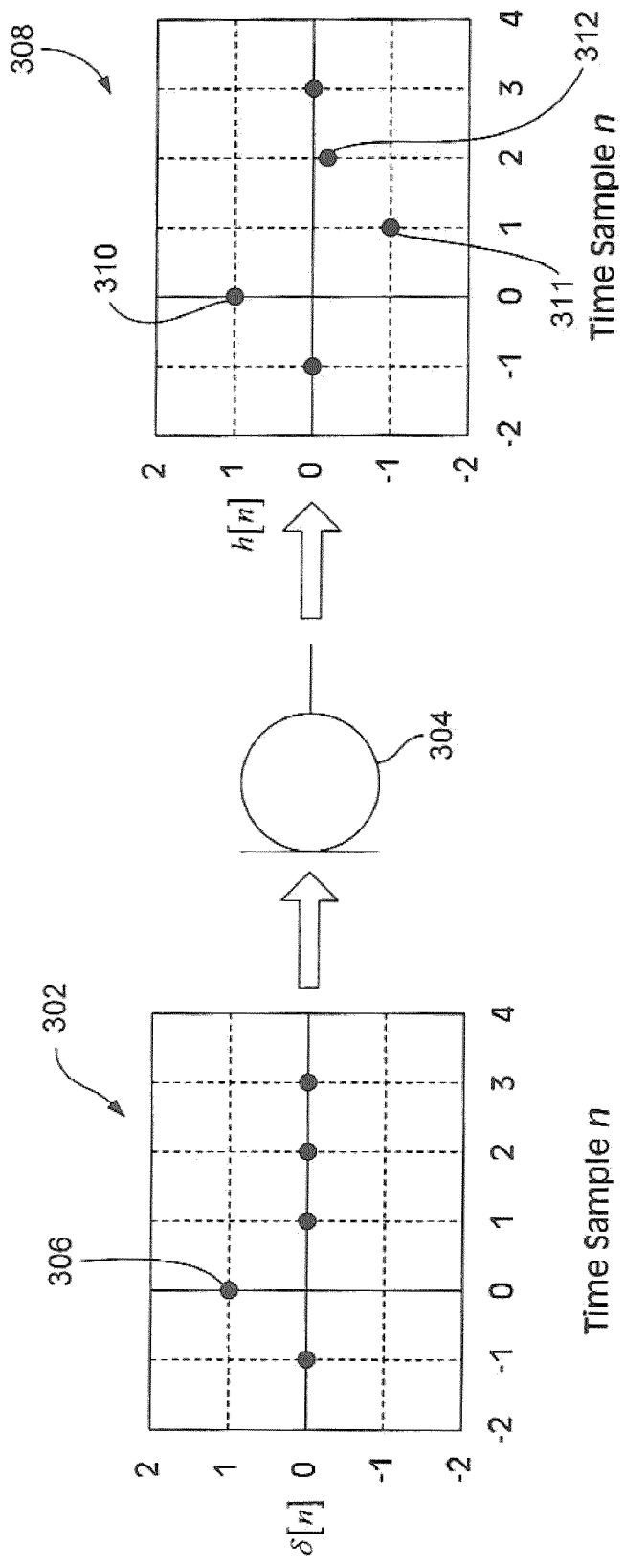
FIG. 3 is a plot of an impulse excitation of a loudspeaker and a plot of an overall room impulse response resulting at the output of the microphone in response to the impulse excitation.

FIG. 3 shows a plot of an impulse x[n] and a plot of an overall room impulse response h[n] produced in response to the impulse x[n]. The impulse response h[n] includes the sound impulse produced by the loudspeaker and the sound of the impulse reflected in the room and received by microphone. In FIG. 3, impulse plot 302 represents an impulse, x[n] input to a hypothetical microphone 304. The impulse x[n] 302 comprises all zeros except for a single nonzero point 306 at n equal to 0 which is represented by dδ[n−p]. In this case, d equals "1" and p equals "0" so the impulse can be represented as δ[n]. In response to the impulse 302, the microphone 304 outputs an impulse response h[n] that is represented by an impulse-response plot 308. The impulse response 308 comprises all zeros except for the three nonzero digital signals represented by points 310-312. An actual digital impulse response to an impulse typically comprises a greater number of nonzero components than contained in the impulse, as shown in FIG. 3. Impulse response 308 can be represented by the 3-component vector:

$$h[0] = \vec{h}_0 = \begin{bmatrix} h_0[0] \\ h_0[1] \\ h_0[2] \end{bmatrix} = \begin{bmatrix} 1 \\ -1 \\ -.25 \end{bmatrix}$$

Typically, the impulse used to determine an impulse response is output from a loudspeaker into a room and is detected by a microphone. The loudspeaker, room, and microphone are referred to as a "system," and an associated impulse response can be referred to as a "system impulse response." A digital signal produced by the loudspeaker of the system is determined by convolving a digital signal x[n] representing the sound produced by the loudspeaker with the impulse response h[n] of the system. The convolved digital signal is represented by $x_c[n]$. FIGS. 4A-4D provide a graphical example of convolving a three-component digital signal x[n] produced by a hypothetical loudspeaker with an impulse response h[n] in order to produce a digital signal $x_c[n]$ output from the system. FIG. 4A is a plot of an example, two-component, impulse response h[n] 402 that is produced by the hypothetical system. The impulse response h[n] is assumed to be invariant with time.

FIG. 4B is a plot of a first component of the digital signal x[n] at a time sample "0." The first component is represented by a scaled impulse 2δ[0] 404. In response to the impulse 2δ[n] 404, the system outputs an impulse-response h[n] comprising a first component 406 at the time sample "0," and outputs a second component 408 at a later time sample "1." The impulse response to the impulse 2δ[n] 404 is essentially the impulse response in FIG. 4A with the components multiplied by the impulse scale factor "2."

FIG. 4C is a plot of a second component of the digital signal x[n] that is input to the system at the later time sample "1." The second component is represented by an impulse δ[n−1] 410. In response to the impulse δ[n−1] 410, the system outputs an impulse-response comprising a third component 412 at the time sample "1," and outputs a fourth component 414 at a later time sample "2." The impulse response to the impulse δ[n−1] 410 is essentially the impulse response in FIG. 4A with the component time samples shifted by a factor of "1." Because the second and the third components 408 and 412 occur at the same time sample "1," the amplitudes of the components 408 and 412 are summed in order to obtain a fifth component 416, which is the output at the time sample "1."

FIG. 4D is a plot of a third component of the digital signal x[n] that is input to the system at the time sample "2." The second component is represented by an impulse −2δ[n−2] 418. In response to the impulse −2δ[n−2], the system outputs an impulse response comprising a sixth component 420 at the time sample "2," and a seventh component 422 at a later time sample "3." The impulse response to the impulse −2δ[n−2] 418 is essentially the impulse response in FIG. 4A with the components multiplied by the scale factor "−2," and the component time samples shifted by a factor of "2." Because the fifth and the sixth components 414 and 420 occur at the same time sample "2," the amplitudes of components 414 and 420 are summed to give an eighth component 424, which is the output at the time sample "2."

Note that convolving the three-component, input digital signal x[n] with the two-component impulse response h[n] outputs the four-component digital signal $x_c[n]$. In general, convolving an N component input digital signal x[n] with an L component impulse response h[n] gives an N+L−1 component convolved digital signal $x_c[n]$.

Components of the convolved digital signal $x_c[n]$ 426, in FIG. 4D, can also be obtained by calculating the scalar or dot product of a two-component vector representation of the impulse response and two-component vectors corresponding to each component of the digital signal x[n] that are given by:

$$\vec{h} = \begin{bmatrix} h[0] \\ h[1] \end{bmatrix} = \begin{bmatrix} 1 \\ -1 \end{bmatrix},$$

and $$\vec{x}[n] = \begin{bmatrix} x[n] \\ x[n-1] \end{bmatrix}$$

The order of the components in the column vectors $\vec{h}$ and $\vec{x}[n]$ are opposite in time ordering with respect to one another. For example, in the column vector $\vec{h}$, the first component h[0] appears earlier in time than the second component h[1], while, in the column vector $\vec{x}[n]$, the first component x[n] appears later in time than the second component x[n−1]. Note that components of the vector $\vec{x}[n]$ corresponding to negative valued time samples are assigned the value "0." For example, the first component 406, in FIG. 4D, is calculated by:

$$x_c[0] = [h[0], h[1]]^T \begin{bmatrix} x[0] \\ x[-1] \end{bmatrix} = [1, -1]^T \begin{bmatrix} 2 \\ 0 \end{bmatrix} = 2$$

where the component x[−1] is assigned the value "0," and the superscript T identifies the matrix transpose operation. The second, third, and fourth components 416, 424, and 422 are calculated as follows:

$$x_c[1] = [h[0], h[1]]^T \begin{bmatrix} x[1] \\ x[0] \end{bmatrix} = [1, -1]^T \begin{bmatrix} 1 \\ 2 \end{bmatrix} = -1,$$

$$x_c[2] = [h[0], h[1]]^T \begin{bmatrix} x[2] \\ x[1] \end{bmatrix} = [1, -1]^T \begin{bmatrix} -2 \\ 1 \end{bmatrix} = -3,$$

and $$x_c[3] = [h[0], h[1]]^T \begin{bmatrix} x[3] \\ x[2] \end{bmatrix} = [1, -1]^T \begin{bmatrix} 0 \\ -2 \end{bmatrix} = 2$$

In general, a component of a convolved digital signal $x_c[n]$ is mathematically determined by:

$$x_c[n] = x[n] * h[n]$$
$$= \vec{h}_n \cdot \vec{x}[n]$$
$$= \sum_{i=0}^{L-1} h_n[i] x[n-i]$$

where

"*" is a symbol representing convolution, and $$\vec{x}[n] = \begin{bmatrix} x[n] \\ x[n-1] \\ \vdots \\ x[n-(L-1)] \end{bmatrix}$$

In order to compute a convolved signal component $x_c[n]$, the L previously obtained digital signal components of the digital signal x[n] are used, and the components of the vector $\vec{x}[n]$ that correspond to negative valued time samples are assigned the value "0."

Figure 5:
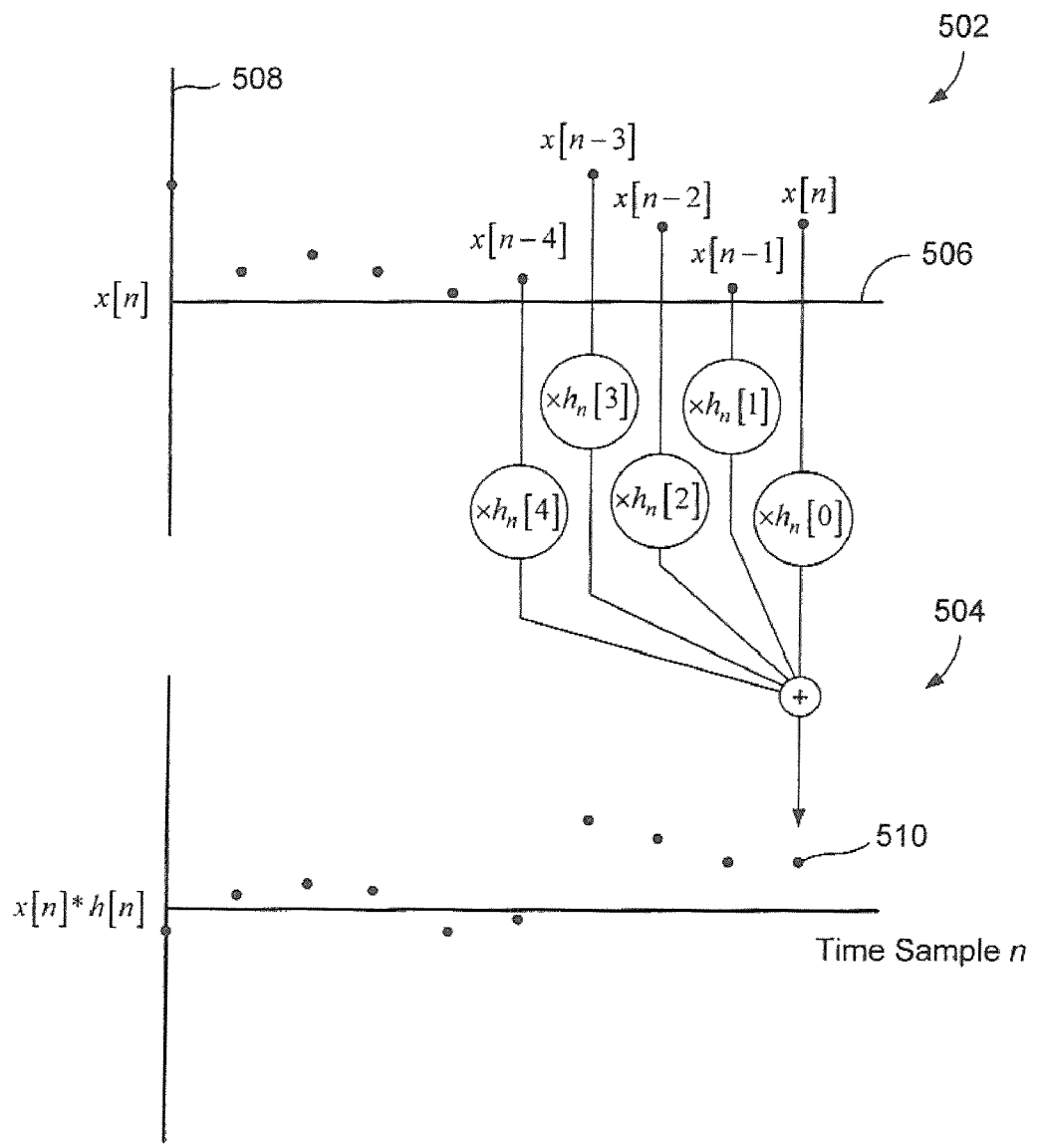
FIG. 5 illustrates convolving a digital signal with a five-component impulse response in order to obtain a convolved digital signal.

FIG. 5 illustrates convolving a digital signal displayed in a plot 502 with a five-component impulse response in order to obtain a convolved digital signal displayed in a plot 504. In plots 502 and 504, horizontal axes, such as horizontal axis 506, are time sample axes, and vertical axes, such as vertical axis 508, are digital number axes. The convolved digital signal sample 510 in the plot 504 is obtained as shown in FIG. 5 and is mathematically represented by:

$$x_c[n] = h[n] * x[n]$$
$$= \vec{h}_n * x[n]$$

$$= [h_n[0] \ h_n[1] \ h_n[2] \ h_n[3] \ h_n[4]]^T \begin{bmatrix} x[n] \\ x[n-1] \\ x[n-2] \\ x[n-3] \\ x[n-4] \end{bmatrix}$$

$$= \sum_{i=0}^{4} h_n[i]x[n-i]$$

In the examples of convolution described above, the impulse response is assumed to remain constant at each time sample in the time domain. However, in practice, the impulse response of a system often depends on the conditions of the room. In other words, the impulse response of the system may change over time as conditions in the room change. For example, an impulse response of a system with no sound produced in the room is different from an impulse response of the same system at a later time when sounds are produced in the room.

Embodiments of the Present Invention

Various embodiments of the present invention are directed to adaptive real-time, acoustic echo cancellation methods and systems for reducing acoustic echoes in a plurality of audio signals transmitted between a first location and a second location. An overview of acoustic echo cancellation method and system embodiments is described first followed by a description of one of many implementation embodiments of the present invention. Embodiments of the present invention are described with reference to numerous block diagrams, control-flow diagrams, mathematical equations, and graphical illustrations.

Figure 6:
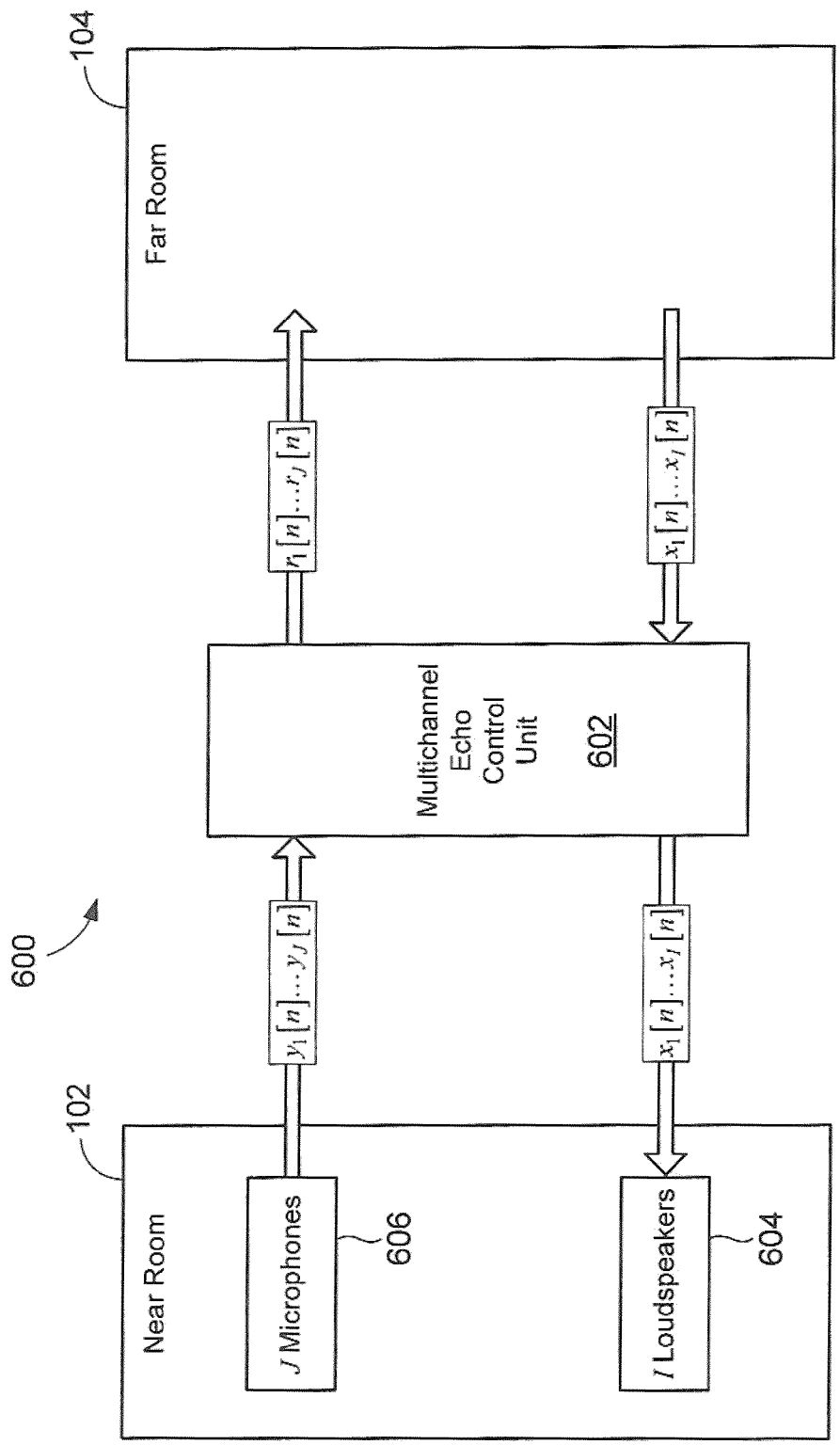
FIG. 6 shows a block diagram of a mixed multichannel audio-communication system that represents an embodiment of the present invention.

I. Overview of Acoustic Echo Cancellation in Mixed Multichannel Audio-Communication Systems FIG. 6 shows a block diagram of a mixed multichannel audio-communication system 600 that represents an embodiment of the present invention. The mixed multichannel audio-communication system 600 includes a multichannel echo control unit ("MECU") 602, and I loudspeakers 604 and J microphones 606 located in the near room 102, where I and J are natural numbers that represent the total number of loudspeakers and the total number of microphones, respectively. The MECU 602 is a computing device that includes one or more processors, such as a central processing unit; optionally one or more display devices, such as a monitor; one or more network interfaces, such as a USB port, an Ethernet, or FireWire port; and one or more computer-readable mediums. Each of these components is operatively coupled to one or more buses. For example, the bus can be an EISA, a PCI, a USB, a FireWire, a NuBus, or a PDS. In other embodiments, the MECU 602 may not include display devices or input devices, such as keyboard or keypad.

The MECU 602 can also include a computer readable medium that can be any medium providing instructions to the processor for calculating and storing approximate impulse response as described below. For example, the computer readable medium can be non-volatile media, such as an optical or a magnetic disk; volatile media, such as memory; and transmission media, such as coaxial cables, copper wire, and fiber optics. Transmission media can also take the form of acoustic, light, or radio frequency waves.

The computer-readable medium also includes an operating system, such as Mac OS, Windows, Unix, and Linux; a network communications module; and an application for carrying out the multichannel acoustic echo methods of the present invention. The operating system can be multi-user, multiprocessing, multitasking, multithreading, real-time and the like. The operating system can also perform basic tasks such as recognizing input from input devices, such as a keyboard or a keypad; sending output to the display; keeping track of files and directories on storage medium; controlling peripheral devices, such as disk drives and printers; and managing traffic on the one or more buses. The network applications include various components for establishing and maintaining network connections, such as software for implementing communication protocols including TCP/IP, HTTP, Ethernet, USB, and FireWire.

As shown in FIG. 6, digital signals $x_1[n], \ldots, x_I[n]$ generated in the far room 104 are transmitted to MECU 602 and are played simultaneously through loudspeakers 604 located in near room 102. Microphones 606 detect sounds produced by people, audio devices, and other noise generating sources located in near room 102 and detect reverberated sounds or echoes produced by sounds originating from loudspeakers 604. Acoustic coupling between loudspeakers 604 and microphones 606 is described below with reference to FIG. 7. The sounds detected by microphones 606 are transmitted in the form of J microphone-digital signals $y_1[n], \ldots, y_J[n]$ to MECU 602. MECU 602, described in greater detail below with reference to FIG. 8, processes the microphone-digital signals $y_1[n], \ldots, y_J[n]$ in order to obtain J processed digital signals $r_1[n], \ldots, r_J[n]$, which are substantially free of acoustic echoes and background noise and are transmitted to far room 104.

In the following description of the present invention, the notation, $\{\cdot\}_N$, where N is the number of elements in the set, is introduced as a compact way of representing a set of N digital signals. For example, the digital signals $x_1[n], \ldots, x_I[n]$ can instead be represented by $\{x_i[n]\}_I$.

Figure 7:
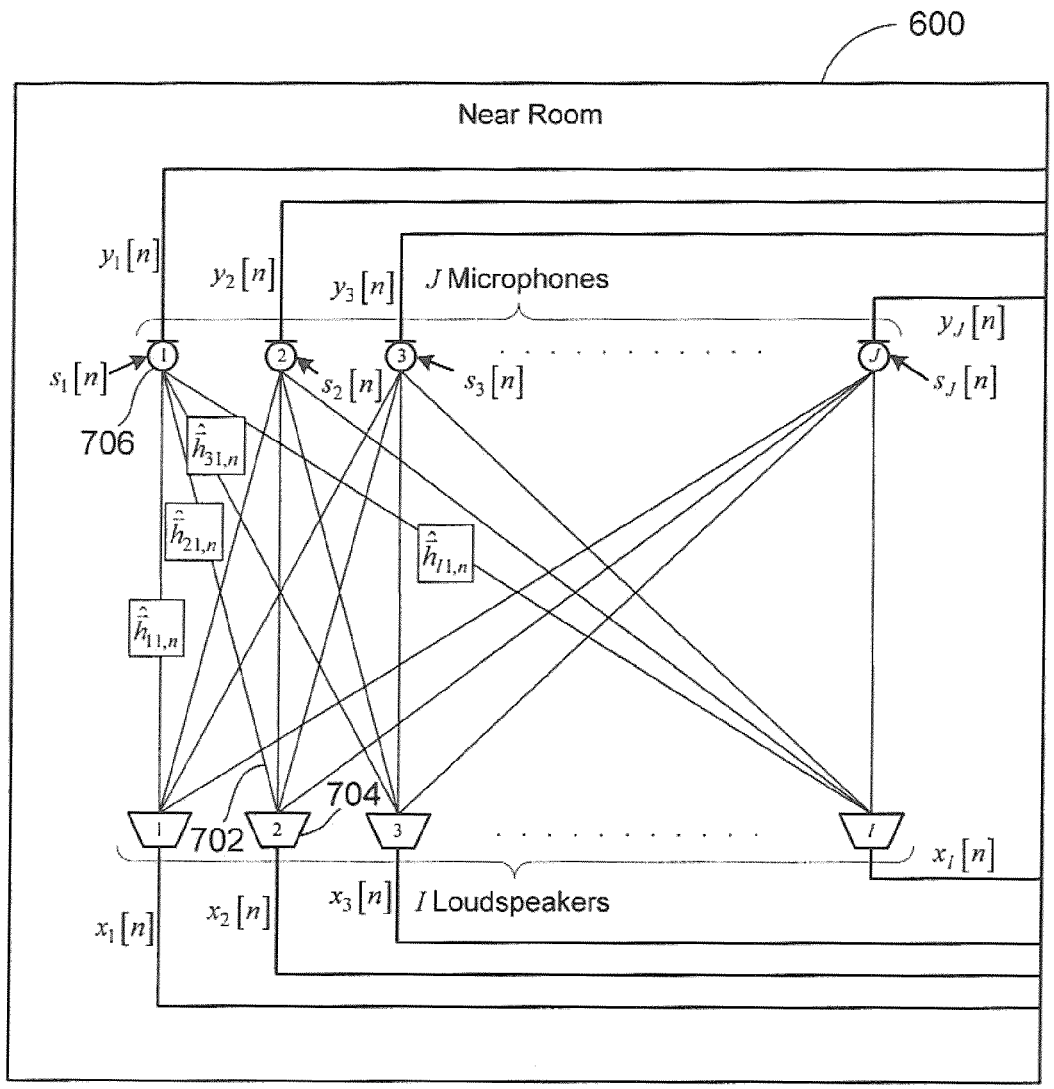
FIG. 7 shows acoustic coupling between the loudspeakers and the microphones, shown in FIG. 6, in accordance with an embodiment of the present invention.

At any given time sample n, acoustic coupling may exist between each loudspeaker and each microphone located in near room 102. This coupling is called an "echo path" and there exists a time varying, real-valued impulse-response vector $\vec{h}_{ij,n}$ each acoustic coupling of an ith loudspeaker and a jth microphone, where $i \in \{1, \ldots, I\}$ is a loudspeaker index, and $j \in \{1, \ldots J\}$ is a microphone index. FIG. 7 shows acoustic coupling between loudspeakers 604 and microphones 606, shown in FIG. 6, that represents an embodiment of the present invention. As shown in FIG. 7, sixteen of the echo paths coupling loudspeakers and microphones are represented by lines, and four of these sixteen echo paths are labeled with a corresponding impulse-response vector $\vec{h}_{ij,n}$. For example, at the time sample n, the impulse-response vector associated with echo path 702 between the $2^{nd}$ loudspeaker 704 and the $1^{st}$ microphone 706 is $\vec{h}_{21,n}$. A reverberated version or echo of a particular digital signal $x_i[n]$ played through the ith loudspeaker and detected by the jth microphone is denoted by $\vec{h}_{ij,n} * x_i[n]$. The total echo associated with the digital signals $\{x_i[n]\}_I$ detected by the jth microphone is given by:

$$e_j[n] = \sum_{i=1}^{I} \vec{h}_{ij,n} * x_i[n]$$

As shown in FIGS. 6 and 7, microphones 606 transmit J microphone-digital signals $\{y_j[n]\}_J$ to MECU 602, where each microphone-digital signal is characterized by:

$$y_j[n] = s_j[n] + e_j[n]$$

and $s_j[n]$ represents a local source signal generated by people, audio devices, and other noise generating sources located in near room 102.

Figure 8:
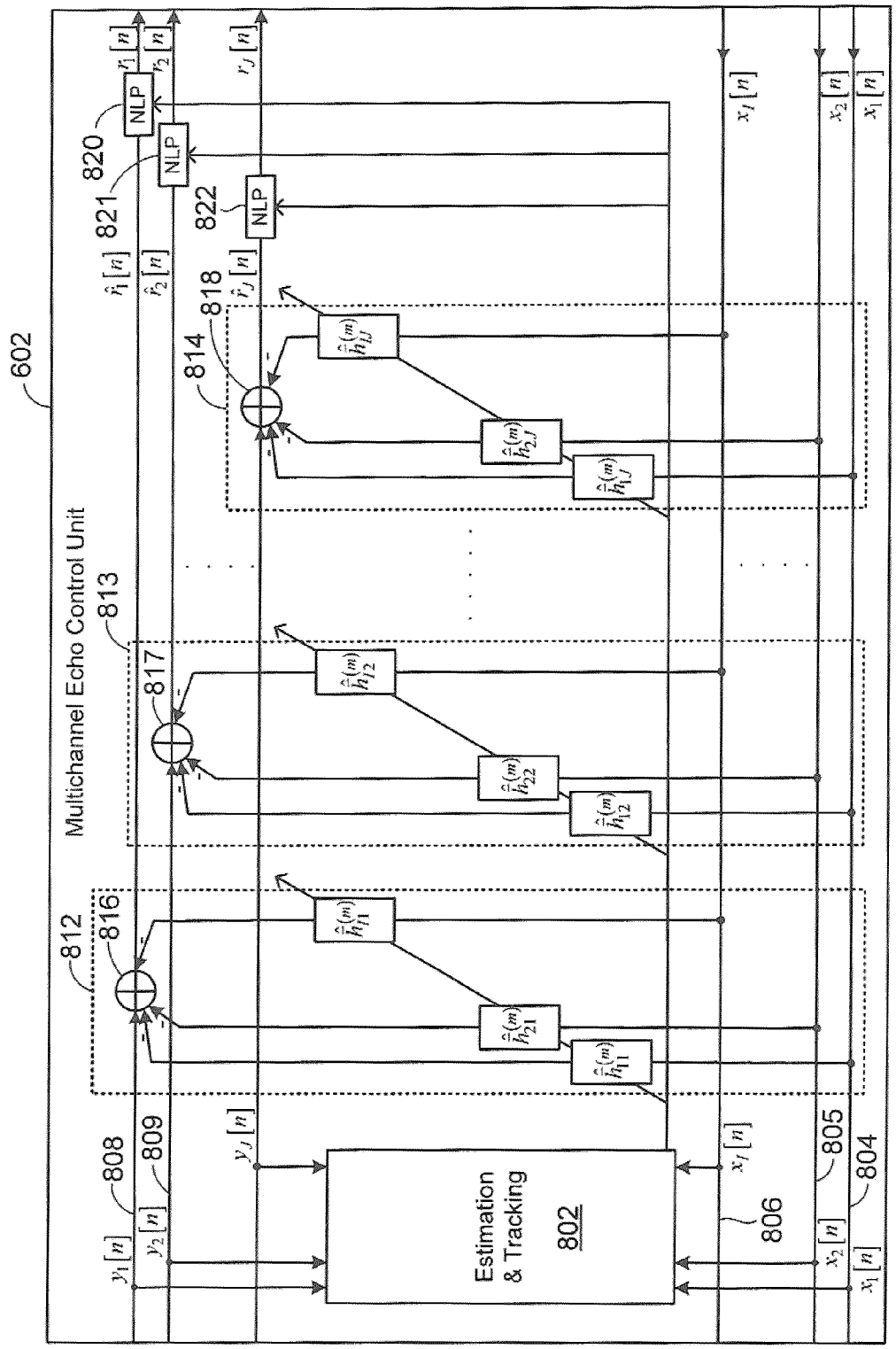
FIG. 8 shows a block diagram of acoustic echo cancellation carried out by a multichannel echo control unit in accordance with an embodiment of the present invention.

For each microphone-digital signal, method and system embodiments of the present invention are directed to substantially cancelling the acoustic echoes $\{e_j[n]\}_J$ from the corresponding microphone-digital signals $\{y_j[n]\}_J$ without causing substantial distortion to the local source signal $\{s_j[n]\}_J$. FIG. 8 shows a block diagram of acoustic echo cancellation carried out by MECU 602, shown in FIG. 6, that represents an embodiment of the present invention. MECU 602 includes an estimation and tracking block 802 that receives the digital signals $\{x_i[n]\}_I$ and the microphone-digital signals $\{y_j[n]\}_J$, as indicated by directional arrows connecting input channels 804-806 and the microphone channels 810-808 to the estimation and tracking block 802. The estimation and tracking block 802 generates approximate impulse response vectors to produce $\{\hat{e}_j[n]\}_J$, which are correspondingly subtracted from the microphone-digital signals $\{y_j[n]\}_J$ at J adaptive filters, three of which are represented by dashed-line boxes 812-814. However, rather than generating approximate-impulse-response vectors $\{\hat{\vec{h}}_{ij,n}\}_{IJ}$ for each time sample n, method embodiments of the present invention are based on the assumption that the impulse-response vector $\{\vec{h}_{ij,n}\}_{IJ}$ exhibits little variation over a number of time samples, $N_c$, called the "coherence time." In other words, for each impulse-response vector, the maximum deviation over $N_c$ time samples is bounded by:

$$\|\vec{h}_{ij,n} - \vec{h}_{ij,n+N_c}\| \leq 2\sqrt{E}$$

where E represents the maximum amplification energy, or gain, produced by a microphone in response to an impulse. As a result, instead of determining a set of approximate-impulse-response vectors $\{\hat{\vec{h}}_{ij,n}\}_{IJ}$ for each time sample n, methods of the present invention compute a set of approximate-impulse-response vectors, denoted by $\{\hat{\vec{h}}_{ij}^{(m)}\}_{IJ}$, at the beginning of every $N_d$ time samples, where $N_d \ll N_c$, and m is a positive integer. An interval with $N_d$ time samples is called a "decision period," and the beginning of a decision period is called a "decision epoch."

Figure 9:
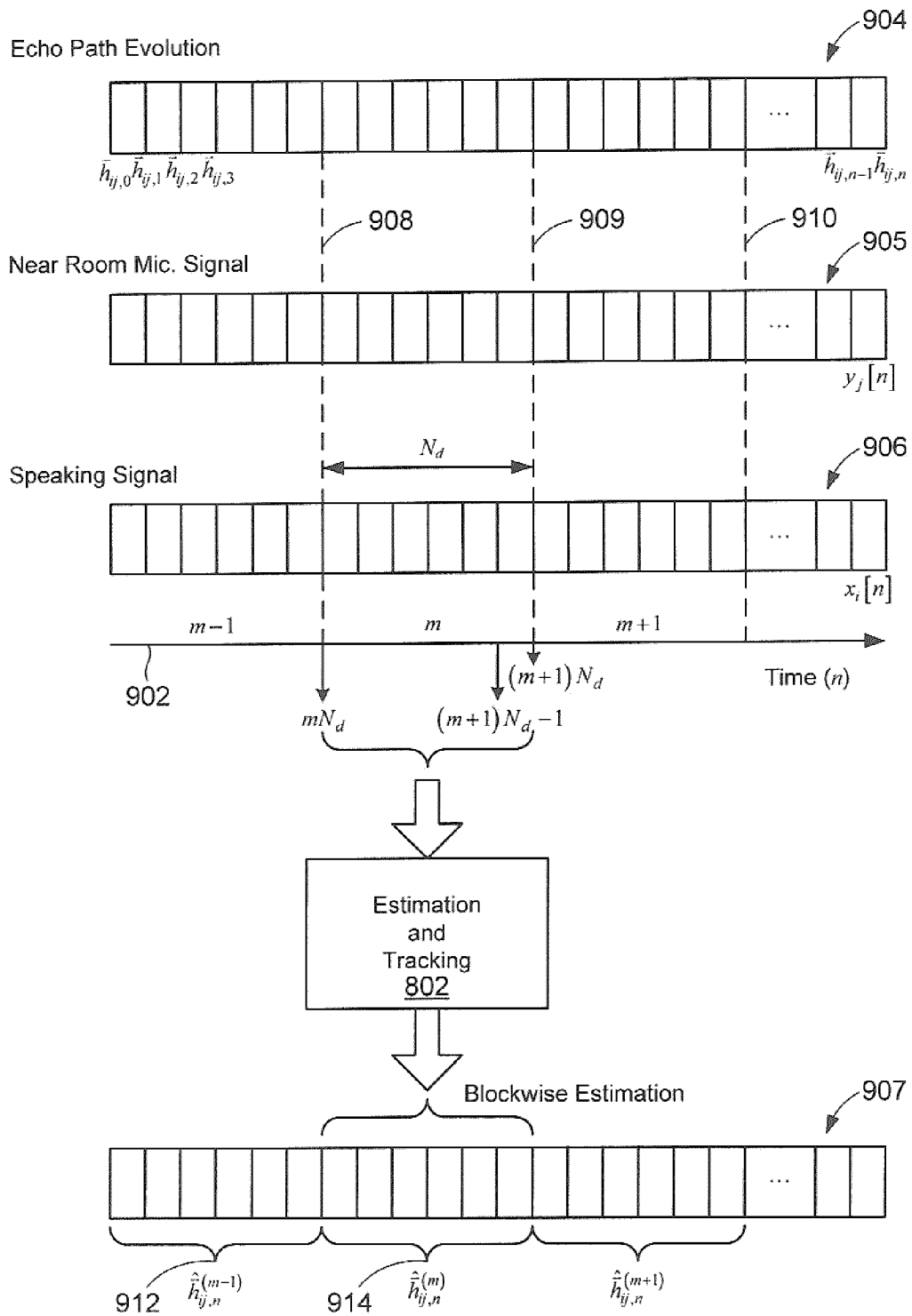
FIG. 9 shows a plot of decision periods and decision epochs associated with approximate-impulse-response vectors in accordance with an embodiment of the present invention.

FIG. 9 shows a plot of decision periods and decision epochs associated with approximate-impulse-response vectors that represent embodiments of the present invention. In FIG. 9, horizontal axis 902 represents a time axis and structures 904-907 represent digital signals and approximate impulse responses for an echo path. Each vertical line segment represents a digital signal or an impulse response associated with a time sample. In particular, the vertical line segments in the structure 904 represent n+1 consecutive impulse-response vectors $\vec{h}_{ij,0}, \ldots \vec{h}_{ij,n}$, the vertical line segments in the structure 905 represent n+1 microphone-digital signals $y_j[n]$, and the vertical line segment in the structure 906 represent n+1 digital signals $x_i[n]$. In FIG. 8, decision periods are comprised of 6 time samples, the beginning of each is identified by one or the dashed lines 908-910. In accordance with method embodiments of the present invention, estimation and tracking block 802, produces a new set of approximate-impulse-response vectors $\{\hat{\vec{h}}_{ij}^{(m)}\}_{IJ}$ at the beginning of each decision period. For example, suppose that during decision period 912, estimation and tracking block 802 produces an approximate-impulse-response vector $\hat{\vec{h}}_{ij}^{(m-1)}$ which is used to determine a reverberated digital signal $\hat{\vec{h}}_{ij}^{(m-1)} * x_i[n]$ for the decision period 912. At the beginning 908 of the next decision period 914, estimation and tracking block 802 produces a new approximate-impulse-response vector $\hat{\vec{h}}_{ij}^{(m)}$ which is then used to determine a reverberated digital signal $\hat{\vec{h}}^{(m)} * x_i[n]$ for the next $N_d$ time samples of decision period 914. In general, at the beginning of a decision period $mN_d$, a set of approximate-impulse-response vectors $\{\hat{\vec{h}}_{ij}^{(m)}\}_{IJ}$ is computed and as the approximate-impulse-response vectors for each time sample n in the interval $[mN_d,(m+1)N_d-1]$.

Returning to FIG. 8, adaptive filters 812-814 represent the first two and last of J adaptive filters, each of which represents convolving the digital signals $\{x_i[n]\}_I$ with corresponding approximate-impulse-response vectors $\{\hat{\vec{h}}_{ij}^{(m)}\}_{IJ}$ generated by estimation and tracking block 802 in order to obtain approximate reverberated digital signals $\{\hat{\vec{h}}_{ij}^{(m)} * x_i[n]\}_{IJ}$. For example, adaptive filter 812 represents convolving the digital signals $\{x_i[n]\}_I$ with the approximate-impulse-response vectors $\{\vec{h}_{i1}^{(m)}\}_I$, respectively, which gives approximate reverberated digital signals $\{\hat{\vec{h}}_{i1}^{(m)} * x_i[n]\}_I$. In general, the jth adaptive filter represents convolving the digital signals $\{x_i[n]\}_I$ with the approximate-impulse-response vectors $\{\vec{h}_{1j}^{(m)}, \ldots, \vec{h}_{ij}^{(m)}, \ldots, \vec{h}_{Ij}^{(m)}\}$, respectively, in order to obtain approximate reverberated digital signals:

$$\{\hat{\vec{h}}_{1j}^{(m)} * x_1[n], \ldots, \hat{\vec{h}}_{ij}^{(m)} * x_i[n], \ldots, \hat{\vec{h}}_{Ij}^{(m)} * x_I[n]\}$$

Summing the reverberated digital signals associated with each of the J adaptive filters produces a set of J approximate acoustic echoes $\{\hat{e}_j[n]\}_J$, where each vector is given by:

$$\hat{e}_j[n] = \sum_{i=1}^{I} \hat{\vec{h}}_{ij}^{(m)} * x_i[n]$$

The J approximate acoustic echoes $\{\hat{e}_j[n]\}_J$ are correspondingly subtracted from each of the microphone-digital signals $\{y_j[n]\}_J$ at summing junctions, such as summing junctions 816-818, resulting in J controlled digital signals $\{\hat{r}_j[n]\}_J$, each element of which is given by:

$$\hat{r}_j[n] = s_j[n] + e_j[n] - \hat{e}_j[n]$$

$$= s_j[n] + \sum_{i=1}^{I} \left( \vec{h}_{ij,n} - \hat{\vec{h}}_{ij}^{(m)} \right) * x_i[n]$$

The difference $$\Delta e_j[n] = e_j[n] - \hat{e}_j[n]$$

is called the "residual echo." Method embodiments of the present invention carried out by estimation and tracking block 802 are directed to reducing the residual echo. Estimation and tracking block 802 also controls nonlinear processing of each of the controlled digital signals $\{\hat{r}_j[n]\}_J$. For example, nonlinear processing blocks ("NPBs") 820-822 are located in microphone channels 808-810, which represent three of the J nonlinear processes carried out by estimation and tracking block 802. The NPBs attenuate background noise and any residual echo carried by a corresponding controlled digital signal in order to produce J processed digital signals $\{r_j[n]\}_J$.

As described above with reference to FIG. 6, MECU 602 produces the J processed digital signals $\{r_j[n]\}_J$ which are transmitted to the far room 104 substantially free of acoustic echoes and background noise.

As shown in FIG. 6, MECU 602 can be located outside the near room 102. In fact, in certain embodiments of the present invention, MECU 602 can be located in an adjacent room, a room in the same building, or a room located tens or even thousands of miles away from near room 102. In other embodiments of the present invention, MECU 602 can be located inside near room 102. In other embodiments of the present invention, a second MECU can be included to cancel acoustic echoes in the digital signals $\{x_i[n]\}_I$ transmitted from the far room 104 to the near room 102.

II. Optimal Dimension Reduction Multichannel Echo Control

Acoustic echo cancellation methods employ manifold learning as a technique to estimate a relatively low dimensional, non-linear model of the space of impulse responses for the near room 102 from a set of noisy observations. This relatively low dimensional model is represented mathematically as a low-dimensional linear or non-linear manifold embedded in a relatively higher dimensional linear embedding space. In this section, manifold learning as a method to mitigate the non-uniqueness problem in multichannel echo control ("MEC") is presented. In MEC systems, method embodiments seek to minimize the energy of an echo, typically expressed as a minimization problem of the form:

$$\inf_{\hat{h} \in \mathbb{R}^D} \|A\hat{h} - y\|^2 \qquad \text{Equation (1)}$$

where A denotes a Toeplitz matrix whose elements are the audio signals that are send to the I loudspeaker signals $x_i[n]$, $$y = \{y_j[n]\}_J$$

is a vector of the J microphone signals, and $$\hat{h} = \{\hat{\vec{h}}_{ij}\}_{IJ}$$

is a candidate estimate of the echo path impulse responses and IJ=D. However, because of the spatial correlation of excitation signals, the minimization problem is typically underdetermined and ill-conditioned.

Methods of the present invention are based on a manifold learning approach to regularize Equation (1), allowing a physically relevant well-conditioned solution. Suppose the search space for impulse responses in the near room 102 is a d-dimensional linear manifold $\mathcal{M}$ embedded in $\mathbb{R}^D$, where d<D. This assumption is supported by experimental observations showing a significant portion of the search space lies within a minor portion of the dimensions. Because the knowledge of $\mathcal{M}$ is not available, initially a data set of noisy samples $$\mathcal{D}_N = \{\hat{\vec{h}}_{ij}\}_N \subset \mathbb{R}^D$$

is used to form an approximation $\hat{\mathcal{M}}$ of $\mathcal{M}$ by first computing the empirical correlation:

$$\Lambda = \frac{1}{N} \sum_{i,j} \hat{\vec{h}}_{ij} \hat{\vec{h}}_{ij}^T$$

Then, an appropriate number d of largest eigenvectors of $\Lambda$ are computed and used as the basis for $\hat{\mathcal{M}}$ and Equation (1) is replaced by:

$$\inf_{\hat{h} \in \hat{\mathcal{M}}} \|A\hat{h} - y\|^2 \qquad \text{Equation (2)}$$

Embodiments of the present invention are directed to determining an optimal reduction in the dimension d, which begins with an average total error analysis of the solution of Equation (2). First, an upper bound on the average total error is determined and factorized into two additive terms: the "approximation error" and the "estimation error." The approximation error is a measure of deviation between $\hat{\mathcal{M}}$ and $\mathcal{M}$ and the estimation error measures the deviation due to additive noise and the ill-conditioning of the system matrix A.

The following is a description and derivation of expressions characterizing the trade-off between the approximation and estimation error terms, showing that as the manifold dimension d increases, the estimation error increases linearly, but the approximation error drops super-linearly. A closed form expression to find the value of d for a minimum total error is derived. It is shown that at this value the marginal decrease in approximation error equals the marginal increase in estimation error. This condition is further expressed in terms of cumulative sum of eigenvalues of the correlation matrix $\Lambda$, the Signal-to-Noise Ratio, denoted by $\gamma$, and the condition number $\chi(A^T A)$, which is the ratio of the largest eigenvalues to the smallest eigenvalue. In one particular case, it is determined, as shown in subsections A-C, that the optimal dimension value for d equals the number of eigenvalues of singular value decomposition of $\Lambda$ that are larger than $$\frac{\chi(A^T A)}{\gamma D^2}$$

In the following subsections A-C, the technique of linear dimension reduction is introduced. Expressions for the approximation error and the estimation error are derived. Finally, the optimal conditions for the dimension d are derived and numerically illustrated.

A. Linear Dimensional Reduction

Several techniques exist for manifold learning and dimension reduction (see e.g., A. Gorban et al. *Principal Manifolds for Data Visualization and Dimension Reduction*, Berlin, Springer, 2007). These manifold learning techniques are divided into two main classes: linear and non-linear techniques. More precisely, given $D_n$, the problem can be expressed as finding a continuous immersion function $$f: \mathcal{N} \to \mathcal{M}$$

whose inverse, referred to as submersion, $$f^{-1}: \mathcal{M} \to \mathcal{N}$$

is also continuous. Here, $\mathcal{N} \subset \mathbb{R}^d$ and d<D denotes the dimension of a manifold. Note that $f^1$ is a projection on the manifold and $f$ is an embedding in an ambient space. Thus, $f^1$ is only a left inverse.

Let the relative dimension be given by:

$$\rho = \frac{d}{D}$$

Given a relative dimension ρ and a class of candidate functions, the function $f$ is found by minimizing the average error between $\vec{\hat{h}}_{ij} \in \mathcal{D}_N$ and its corresponding output $\tilde{h}_{ij}$ resulting from the process, as follows: Let $f$ and $f^1$ be given by $$f^{-1}(h) = U^T h$$

$$f(y) = Uy$$

where U is a d×D orthogonal matrix such that $U^T U = I_d$. The optimal choice for U is found by minimizing $$\frac{1}{N} \sum_{\vec{h}_{ij} \in \mathcal{D}_N} \left\| \vec{\hat{h}}_{ij} - UU^T \vec{\hat{h}}_{ij} \right\|^2 \quad \text{Equation (3)}$$

Solving this equation for U, U is a matrix formed by the d largest eigenvectors of the empirical correlation matrix $$\Lambda = \frac{1}{N} \sum_{i,j} \hat{h}_{ij} \hat{h}_{ij}^T$$

Let $$\Lambda = [U \ V] \begin{bmatrix} \Sigma & 0 \\ 0 & \Delta \end{bmatrix} \begin{bmatrix} U^T \\ V^T \end{bmatrix}$$

denote the singular value decomposition of Λ where Σ and Δ are diagonal matrices containing the d largest eigenvalues and D−d lowest eigenvalues in descending order, respectively. The minimum of Equation (3) is $$\frac{1}{N} \sum_{\vec{h}_{ij} \in \mathcal{D}_N} \left\| V^T \hat{h}_{ij} \right\|^2 = tr(\Delta)$$

Figure 10A:
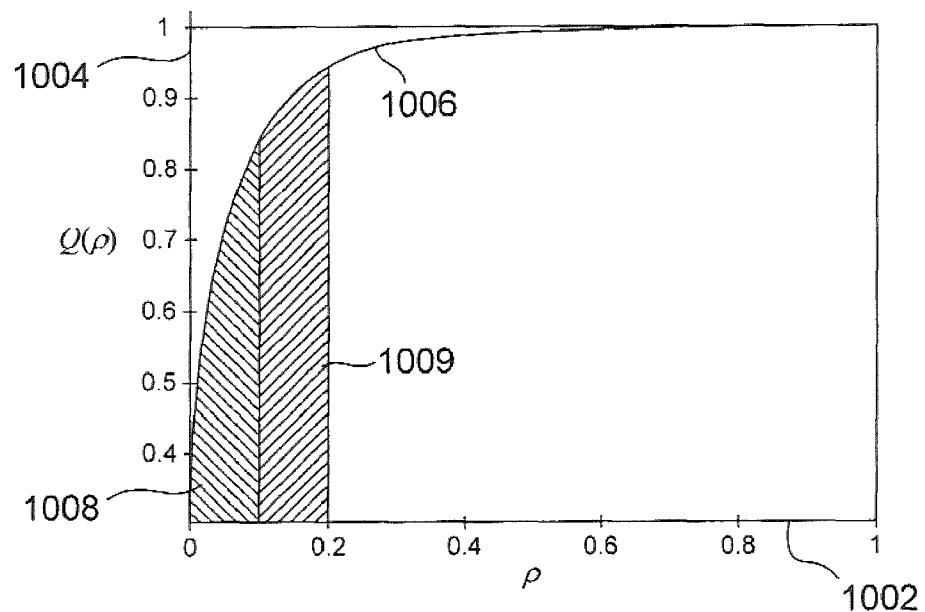
FIG. 10A shows a plot of the accumulative sum of the eigenvalues of 2000 acoustic impulse responses between random pairs of locations in a 5×10×3 $m^3$ room obtained in accordance with embodiments of the present invention.

A key observation obtained from experimental results is that tr (Δ) is a small percentage of tr (Λ). FIG. 10A shows a plot of the accumulative sum of the eigenvalues of 2000 acoustic impulse responses between random pairs of locations in a 5×10×3 meter room obtained in accordance with embodiments of the present invention. These impulse responses are computed using the image method of J. B. Allen et al., "Image method for efficiency simulating small-room acoustics," *J. Acoust. Soc. Am.*, vol. 66, pp. 943-950, Apl. 1979, for a sampling frequency of 8 KHz. In FIG. 10A, axis 1002 represents the relative dimension ρ, and axis 1004 represents the values of normalized accumulative sum of the d eigenvalues given by:

$$Q(\rho) = \frac{\sum_{i=1}^{\lfloor \rho D \rfloor} \lambda_i}{\sum_{i=1}^{D} \lambda_i} \quad \text{Equation (4)}$$

where $\lambda_i$ denotes the i-th largest eigenvalue of singular value decomposition of Λ. Curve 1006 represents the accumulative sum Q as function of ρ. Region 1008 between the curve 1006 indicates that about 84% of the energy of Λ lies in 10% of its eigenvalues. Curve 1006 also indicates that as ρ increases, accuracy improves, and combined regions 1008 and 1009 indicate that about 94% of the energy of Λ lies in 20% of its eigenvalues. However, this increase in approximate accuracy comes at the expense of an increased estimation error, as discussed below. In subsection IV, an expression for the optimal value of ρ is derived.

B. Error Analysis

Consider an approximation for $\mathcal{M}$ given by:

$$\hat{\mathcal{M}} = \{h \in \mathbb{R}^D : V^T h = 0\}$$

Now, Equation (2) can be expressed as:

$$\inf \|A\hat{h} - y\|^2 \quad \text{Equation (5)}$$

such that $$V^T h = 0$$

Suppose the true underlying element is $h_0$ and let $$y = Ah_0 + v$$

where v denotes the additive noise term. Solving Equation (5) for h gives:

$$(U^T A^T AU)U^T h = U^T A^T A h_0 + U^T A^T v$$

Figure 10B:
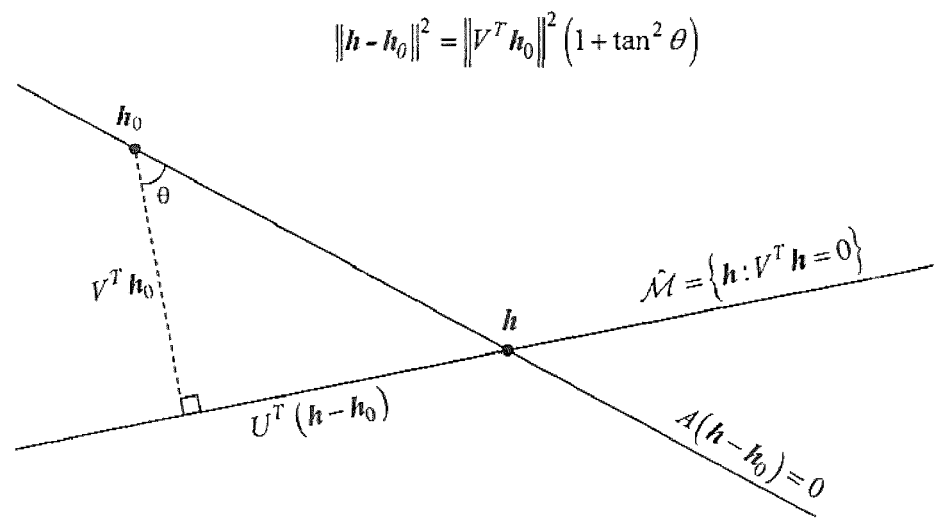
FIG. 10B shows a hypothetical representation of a geometry of a solution for a hypothetical example in $\mathbb{R}^2$ in accordance with embodiments of the present invention.

FIG. 10B shows a hypothetical representation of the geometry of the solution for a hypothetical example in $\mathbb{R}^2$ where $\|v\|=0$ in accordance with embodiments of the present invention. The difference between the estimated solution h and the true solution $h_0$ can be expanded as $$\|h - h_0\|^2 = \|V^T h_0\|^2 \left( 1 + \frac{\|U^T(h - h_0)\|^2}{\|V^T h_0\|^2} \right)$$

In this equation, the second multiplicative term is a measure of the angular alignment between the estimated manifold $\hat{\mathcal{M}}$ and the space of solutions $A(h - h_0) = 0$. For the example in FIG. 10B, this term is $1 + \tan^2\theta$. Thus, fixing $\|V'x_0\|$ the minimum error is achieved when θ=0.

With some algebraic manipulation, we find that $$\|h - h_0\|^2 \leq 2 \|V^T h_0\|^2 (1 + \|(U^T A^T AU)^{-1} U^T A^T AV\|^2) + 2\| (U^T A^T AU)^{-1} U^T A^T v \|$$

The first term in this inequality represents the approximation second term represents the effect of the additive noise.

Assume that $h_0$ is a random point in $\mathcal{D}_n$ drawn using the empirical density of $D_n$, and assume a uniform distribution over all matrices similar to $A^T A^2$. Taking the expectation value with respect to $h_0$ and $A^T A$, gives:

$$E_{value}(\|h-h_0\|) \leq C(\rho)$$

where $$C(\rho) \triangleq 2(1-Q(\rho))tr(\Lambda)\left(1 + tr\left((A^T A)^{-1}\rho\right)\right) + 2\frac{\chi(A^T A)}{\gamma D}\rho \quad \text{Equation (6)}$$

denotes an upper bound on the total error in terms of average signal to noise ratio per dimension $$\gamma = \frac{tr(A^T A)}{D\|v\|^2}$$

and the aggregated condition number of the matrix $A^T A$ $$\chi(A^T A) = tr(A^T A)tr((A^T A)^{-1})$$

Note that $\chi(A^T A)$ is a lower bound of the commonly used notion of condition number, which is the ratio of maximum eigenvalues to the minimum eigenvalues.

C. Optimal Dimension

The expression for total (bound on) error in Equation (6) $C(\rho)$ has two terms. The first term represents (an upper bound) on the average approximation error that occurs by approximating $\mathcal{M}$ with $\hat{\mathcal{M}}$ which is denoted by:

$$C_{app}(\rho) \triangleq 2(1-Q(\rho))tr(\Lambda)\left(1 + tr\left((A^T A)^{-1}\rho\right)\right)$$

The other term in Equation (6) represents the estimation error caused by the additive noise and is an upper bound on estimation error, denoted by:

$$C_{est}(\rho) \triangleq 2\frac{\chi(A^T A)}{\gamma D}\rho$$

Figure 10C:
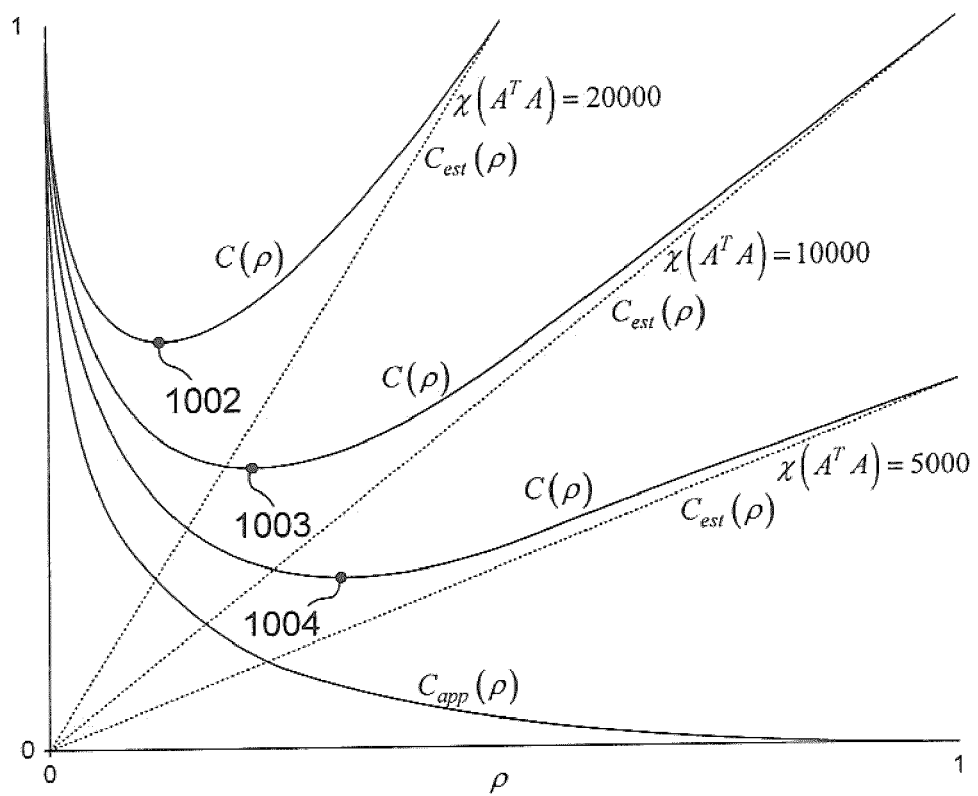
FIG. 10C shows a plot of total error, approximation error, and estimation error in accordance with embodiments of the present invention.

FIG. 10C shows a plot of the total error, the approximation error, and the estimation error versus $\rho$ for $\gamma = 10$ dB and $D = 2000$ and for three different values of $\chi(A^T A)$. As shown in FIG. 10C, as $\rho$ increases, the approximation error $C_{app}(\rho)$ decreases but the estimation error increases linearly. Points 1002-1004 represent the optimal values of $\rho$ for three different values 20000, 10000, and 5000 for $\chi(A^T A)$. The optimal $\rho$ shifts to the right as $\gamma$ increases or the condition number of $A^T A$ decreases.

The optimal values for $\rho$ of Equation (6) can be found by considering $\rho$ a continuous variable and taking derivative of Equation (6) with respect to $\rho$ to obtain:

$$\frac{\partial C_{app}(\rho)}{\partial \rho} + \frac{\partial C_{est}(\rho)}{\partial \rho} = 0$$

Substituting the expression for $C_{app}(\rho)$ and $C_{est}(\rho)$ provided above gives:

$$\frac{\partial Q(\rho)}{\partial \rho} = \frac{1 - Q(\rho) + \frac{\chi(A^T A)}{\gamma Dtr(\Lambda)tr((A^T A)^{-1})}}{\rho + \frac{1}{tr((A^T A)^{-1})}} \quad \text{Equation (7)}$$

This equation expresses the condition for optimal choice of $\rho$ with respect to the normalized accumulative sum of the eigenvalues of $\Lambda$ along with $\gamma$ and the condition number of $A^T A$. It can be solved numerically to find a threshold $\eta$ such that the number of eigenvalues above $\eta$ determines d.

Equation (7) can be further simplified if $tr((A^T A)) \ll 1$. When this condition is satisfied, Equation (7) reduces to $$\frac{\partial Q(\rho)}{\partial \rho} \approx \frac{\chi(A^T A)}{\gamma Dtr(\Lambda)}$$

Equivalently, by substituting for $Q(\rho)$ from Equation (4), the optimal dimension d is the number of eigenvalues of the singular value decomposition of $\Lambda$ that are larger than the cutoff threshold:

$$\eta \triangleq \frac{\chi(A^T A)}{\gamma D^2}$$

Thus, the optimal dimension d increases as $\chi(A^T A)$ decreases or as $\gamma$ increases.

III. Implementation

The estimation and tracking 802 may also include direct current ("DC") offset removal for signals transmitted between near room 102 and estimation and tracking 802. DC offset is a low-frequency distortion often caused by electrical interference. This electrical interference creates a constant voltage that can cause clicks and pops in the sound output from a loudspeaker. DC offset removal corrects the DC offset in each of the digital signals $\{x_i[n]\}_I$ produced in the far room 104 as follows:

$$x_i[n] = ax_i[n-1] + 0.5(1+a)(x_{i,rec}[n] - x_{i,rec}[n-1])$$

where a is a constant ranging from about 0.9 to about 0.9999, and corrects the DC offset in each of the microphone-digital signals $\{y_j[n]\}_J$ produced in the near room 102 as follows:

$$y_j[n] = ay_j[n-1] + 0.5(1+a)(y_{j,mic}[n] - y_{j,mic}[n-1])$$

Control-flow diagrams shown in FIGS. 10-16 and the following discussion provide a description of one of many method embodiments for reducing an acoustic echo in microphone-digital signals $\{y_j[n]\}_J$ and generating associated processed digital signals $\{r_j[n]\}_J$.

Figure 11:
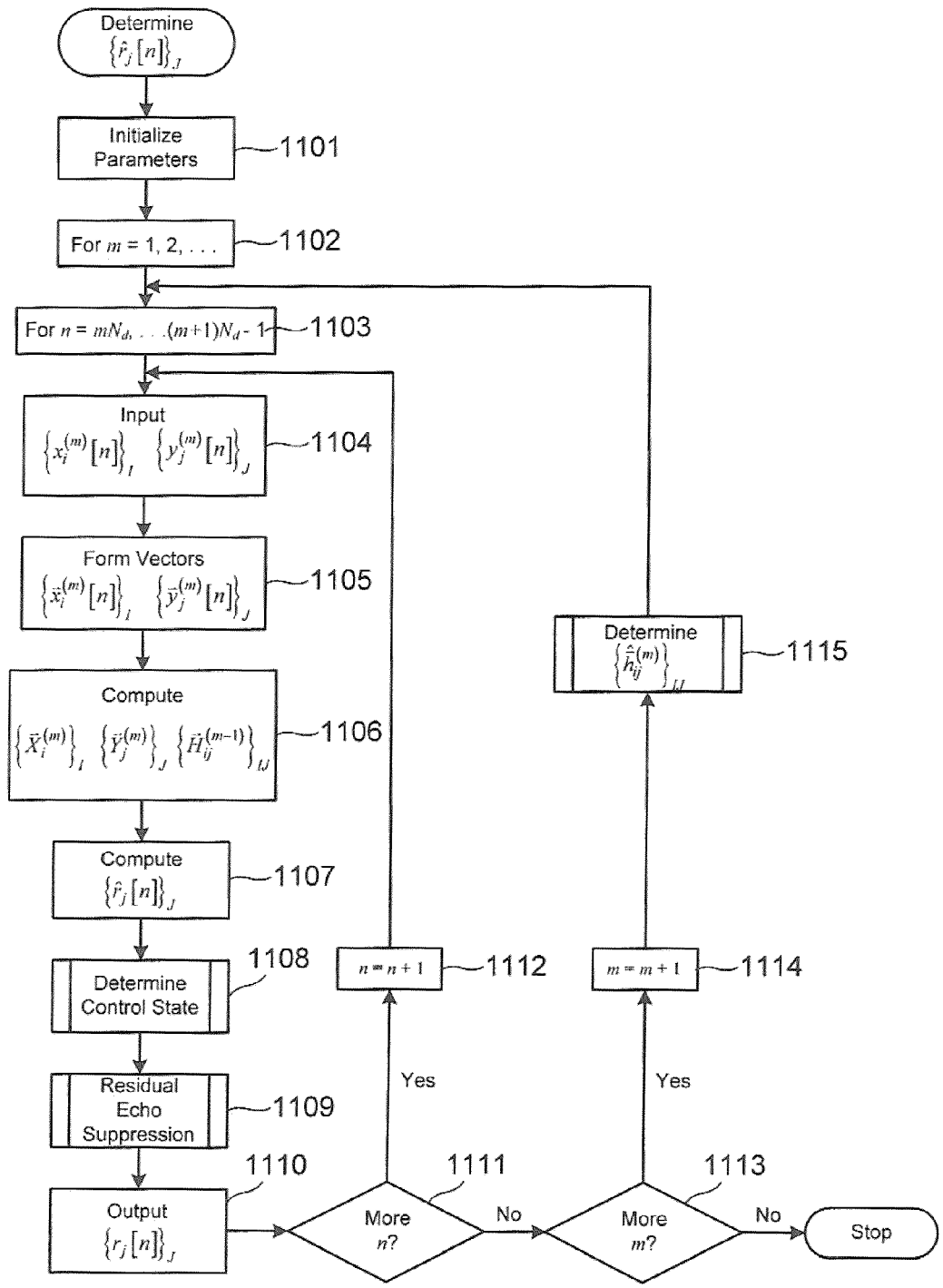
FIG. 11 shows a control-flow diagram that represents an embodiment of the present invention for reducing acoustic echoes in a plurality of audio signals transmitted from a first location to a second location.

FIG. 11 shows a control-flow diagram that represents an embodiment of the present invention for reducing acoustic echoes in a plurality of audio signals that are transmitted from near room 102 to far room 104. In step 1101 of FIG. 11, parameters used in the equations described below are initialized. Tables 1-3 display these parameters and associated example initial values that may be used in certain applications. Note that values displayed in Tables 1-3 depend on the room setup, and therefore, are subject to change.

Table 1 displays constants that typically remain unchanged during operation of the method embodiments of the present invention. Table 1 also includes example values associated with each of the constants.

TABLE 1

| Parameter | Value |
|---|---|
| L | 6000 |
| $N_d$ | 288 |
| P | 5($N_d$) |
| N | 8192 |
| β | 0.001 |
| λ | 0.001 |
| $K_1$ | 0.995 |
| $K_2$ | 0.3 |
| $G_{max}$ | 1.0 |
| $G_{min}$ | 0.1 |
| M | 12 |

Note that the values associated with the parameters displayed in Table 1 can be adjusted based on different near and far room conditions and room configurations. The parameter P is the number of digital signals $y_j^{(m)}[n]$ in the digital signal vector $\vec{y}_j^{(m)}[n]$ described below with reference to step 1004 in FIG. 10. The parameter N is the number of digital signals in the frequency domain vectors $\vec{X}_i^{(m)}$, $\vec{Y}_j^{(m)}$, and $\vec{\hat{H}}_{ij}^{(m)}$. The parameters β, λ, $K_1$, and $K_2$ are values that are used to assign relative importance or weight to terms in equations described below with reference to FIGS. 13 and 16. The parameters $G_{max}$ and $G_{min}$ are the maximum and minimum gain associated with each of the J microphones. The parameter M is used during double talk described below with reference to FIG. 12.

Table 2 shows initial values for variable parameters that change during iterations of the methods described below with reference to FIGS. 12-13:

TABLE 2

| Parameter | Initial Value |
|---|---|
| $\dot{\sigma}_{i,x}^{2\,(0)}$ | 0.01 |
| $\dot{\sigma}_{j,y}^{2\,(0)}$ | 0.01 |
| $\dot{\sigma}_{j,\hat{r}}^{2\,(0)}$ | 0.01 |
| $\ddot{\sigma}_{j,n}^{2\,(0)}$ | 0.01 |
| $\ddot{\sigma}_{i,x}^{2\,(0)}$ | 0.01 |
| $\ddot{\sigma}_{j,y}^{2\,(0)}$ | 0.01 |
| $M_{i,x}^{2(0)}$ | 0 |
| $M_{j,y}^{2(0)}$ | 0 |
| $G^{(0)}$ | 0 |

The parameters $\dot{\sigma}_{i,x}^{2\,(0)}$ and $\dot{\sigma}_{j,y}^{2\,(0)}$ are short-term energy variances associated with the digital signals $x_i^{(m)}[n]$ and $y_j^{(m)}[n]$, respectively. The parameter $\dot{\sigma}_{j,\hat{r}}^{2\,(0)}$ is the short-term energy variance associated with the energy in the controlled digital signal $\hat{r}_j[n]$. The parameters $\ddot{\sigma}_{i,x}^{2\,(0)}$ and $\ddot{\sigma}_{j,y}^{2\,(0)}$ are long-term energy variances associated with the digital signals $x_i^{(m)}[n]$ and $y_j^{(m)}[n]$, respectively. The parameter $\ddot{\sigma}_{j,n}^{2\,(0)}$ is a long-term energy variance associated with noise. The parameters $M_{i,x}^{2(0)}$ and $M_{j,y}^{2(0)}$ are maximum square energies associated with the digital signals $x_i^{(m)}[n]$ and $y_j^{(m)}[n]$. The parameter $G^{(0)}$ is an initial gain adaptation value described below with reference to FIG. 13.

Table 3 shows initial values for components of vectors $\vec{S}_{i,xx}^{(0)}$, $\vec{S}_{j,\hat{r}\hat{r}}^{(0)}$, $\Lambda_{ij}^{(0)}$, $\vec{\tilde{h}}_{ij}^{(0)}$, and $\vec{\hat{h}}_{ij}^{(0)}$ that change during iterations of the method described below with reference to FIGS. 15-16:

TABLE 3

| Component | Initial Value | Component Index |
|---|---|---|
| $S_{i,xx}^{(0)}[k]$ | 1.0 | k = 0, ..., N − 1 |
| $S_{j,\hat{r}\hat{r}}^{(0)}[k]$ | 1.0 | k = 0, ..., N − 1 |
| $\Lambda_{ij}^{(0)}[n']$ | 1.0 | n' = 0, ..., L − 1 |
| $\tilde{h}_{ij}^{(0)}[n']$ | 0.0 | n' = 0, ..., L − 1 |
| $\hat{h}_{ij}^{(0)}[n']$ | 0.0 | n' = 0, ..., L − 1 |

The vector $\vec{S}_{i,xx}^{(0)}$ is an initial average spectrum associated with the vector $\vec{X}_i^{(m)}$, and the vector $\vec{S}_{j,\hat{r}\hat{r}}^{(0)}$ is an initial average spectrum associated with a vector $\vec{\hat{R}}_j^{(m)}$, which are described below with reference to step 1502 in FIG. 15. The matrix $\Lambda_{ij}^{(0)}$ defines an evolving model of the near room described below with reference to step 1507 in FIG. 15. The vector $\vec{\tilde{h}}_{ij}^{(0)}$ is an initial shadow-impulse-response vector described below with reference to step 1512 in FIG. 15. The vector $\vec{\hat{h}}_{ij}^{(0)}$ is an initial approximate-impulse-response vector described below with reference to step 1513 in FIG. 15.

In the for-loop beginning in step 1102, steps 1103-1115 are repeated for each decision epoch m. In the for-loop beginning in step 1103, steps 1104-1112 are repeated for each time sample n. In step 1104, the estimation and tracking unit 802 receives I digital signals $\{x_i^{(m)}[n]\}_I$ output from the far room 104, and J digital signals $\{y_j^{(m)}[n]\}_J$ output from the near room 102. In step 1105, a set of digital signal vectors $\{\vec{x}_i^{(m)}[n]\}_I$ is formed, where each digital signal vector is an (L+P)-component digital signal vector:

$$\vec{x}_i^{(m)}[n] = \begin{bmatrix} x_i^{(m)}[n] \\ x_i^{(m)}[n-1] \\ \vdots \\ x_i^{(m)}[n-(L+P-1)] \end{bmatrix}$$

formed from the digital signal $x_i^{(m)}[n]$ and L+P−1 previous digital signals $x_i^{(m)}[n]$, and a set of microphone-digital signal vectors $\{\vec{y}_j^{(m)}[n]\}_J$ is formed, where each microphone-digital signal vector is a P-component microphone-digital signal vector $$\vec{y}_j^{(m)}[n] = \begin{bmatrix} y_j^{(m)}[n] \\ y_j^{(m)}[n-1] \\ \vdots \\ y_j^{(m)}[n-(P-1)] \end{bmatrix}$$

formed from the microphone-digital signal $y_j^{(m)}[n]$ and P−1 previous digital signals $y_j^{(m)}[n]$. In step 1106, a fast Fourier transformation ("FFT") is applied to the each vector in the sets $\{\vec{x}_i^{(m)}[n]\}_I$, $\{\vec{y}_j^{(m)}[n]\}_J$ and $\{\vec{\hat{h}}_{ij}^{(m-1)}\}_{I,J}$ in order to obtain corresponding sets of domain frequency vectors $\{\vec{X}_i^{(m)}\}_I$, $\{\vec{Y}_j^{(m)}\}_J$ and $\{\vec{\hat{H}}_{ij}^{(m-1)}\}_{I,J}$, where vector elements are given by:

$$\overline{X}_i^{(m)} = \begin{bmatrix} X_i^{(m)}[0] \\ X_i^{(m)}[1] \\ \vdots \\ X_i^{(m)}[N-1] \end{bmatrix}$$

$$= FFT \left\{ \begin{bmatrix} x_i^{(m)}[n] \\ x_i^{(m)}[n-1] \\ \vdots \\ x_i^{(m)}[n-(L+P-1)] \end{bmatrix} \right\},$$

$$\overline{Y}_j^{(m)} = \begin{bmatrix} Y_j^{(m)}[0] \\ Y_j^{(m)}[1] \\ \vdots \\ Y_j^{(m)}[N-1] \end{bmatrix}$$

$$= FFT \left\{ \begin{bmatrix} y_j^{(m)}[n] \\ y_j^{(m)}[n-1] \\ \vdots \\ y_j^{(m)}[n-(P-1)] \end{bmatrix} \right\}, \text{ and}$$

$$\hat{\overline{H}}_{ij}^{(m-1)} = \begin{bmatrix} \hat{H}_{ij}^{(m-1)}[0] \\ \hat{H}_{ij}^{(m-1)}[1] \\ \vdots \\ \hat{H}_{ij}^{(m-1)}[N-1] \end{bmatrix}$$

$$= FFT \left\{ \begin{bmatrix} \hat{h}_{ij}^{(m-1)}[n] \\ \hat{h}_{ij}^{(m-1)}[n-1] \\ \vdots \\ \hat{h}_{ij}^{(m-1)}[n-(L-1)] \end{bmatrix} \right\}$$

An FFT and a corresponding inverse fast Fourier transform ("IFFT") are types of Fourier transformations that are often employed to avoid carrying out convolution in the time sample domain. Using the FFT and the IFFT can be hundreds or even thousands of times faster than convolving digital signals in the time sample domain. A number of different FFT and IFFT methods are described in the book "Discrete-Time Signal Processing ($2^{nd}$ Edition)," by A. Oppenhiemer, R. Schafer, and J. Buck, Prentice Hall, Inc., (1999-2000), which is just one of many references for the field of digital signal processing. Additional details can be obtained from the above-referenced book, or from many other textbooks, papers, and journal articles in this field. In step 1107, a set of controlled digital signal vectors $\{\hat{\vec{r}}_j^{(m)}[n]\}_J$ are computed, where each controlled digital signal vector is computed as follows:

$$\hat{\vec{r}}_j^{(m)}[n] = Tr_{N_d} \cdot IFFT \left\{ \overline{Y}_j^{(m)} - \sum_{i=1}^{I} \overline{X}_i^{(m)} \cdot (\hat{\overline{H}}_{ij}^{(m-1)})^* \right\}$$

where $Tr_{N_d}$ is a truncation operator of length $N_d$,

∘ represents component-wise multiplication of two vectors, $$\hat{\vec{r}}_j^{(m)}[n] = \begin{bmatrix} \hat{r}_j^{(m)}[n] \\ \hat{r}_j^{(m)}[n-1] \\ \vdots \\ \hat{r}_j^{(m)}[n-(N_d-1)] \end{bmatrix}, \text{ and}$$

$$\sum_{i=1}^{I} \overline{X}_i^{(m)} \cdot (\hat{\overline{H}}_{ij}^{(m-1)})^*$$

represents the frequency domain acoustic echo in the jth microphone-digital signal.

Component-wise multiplication of the 3-tuples (1,2,3) and (3,1,2) is represented by:

(1,2,3)·(3,1,2=(1·3,2·1,3·2)=(3,2,6)

In step 1108, the routine "determine control state" is called, which identifies four types of audio signal transmissions that can exist between the near room 102 and the far room 104. The four types of audio signal transmissions are called "control states" ("CS") and are identified as follows: (1) an audio signal is output from the near end room 102 only and is represented by $S_{NEO}$; (2) an audio signal is output from the far end room 104 only and is represented by $S_{FEO}$; (3) audio signals are simultaneously output from both the near end room 102 and the far end room 104, which is called "double-talk," is represented by $S_{DT}$; and (4) no audio signals output from the near end room 102 and the far end room 104 is represented by $S_{NS}$. In step 1109, the routine "residual echo suppression" is called in order to compute J gain-corrected processed digital signals $\{r_j^{(m)}[n]\}_J$. In step 1110, the processed digital signals $\{r_j^{(m)}[n]\}_J$ are transmitted to the far room 104. In step 1111, when n is less than or equal to $(m+1)N_d-1$, control passes to step 1112, otherwise control passes to step 1013. In step 1112, the time sample n is incremented by "1," and steps 1104-1111 are repeated. In other words, the approximate-impulse-response vectors $\{\hat{\vec{h}}_{ij,n}\}_{IJ}$ are not updated during the $N_d$ decision period. In step 1113, when another decision epoch m is available, control passes to step 1114, otherwise the routine "determine $\{r_j[n]\}_J$" is terminated. In step 1114, the decision epoch m is incremented by "1." In step 1115, the routine "determine $\{\hat{\vec{h}}_{ij,n}\}_{IJ}$" is called. In other words, a new decision period with $N_d$ decision epochs is initiated and the approximate impulse response vectors are updated.

Figure 12A:
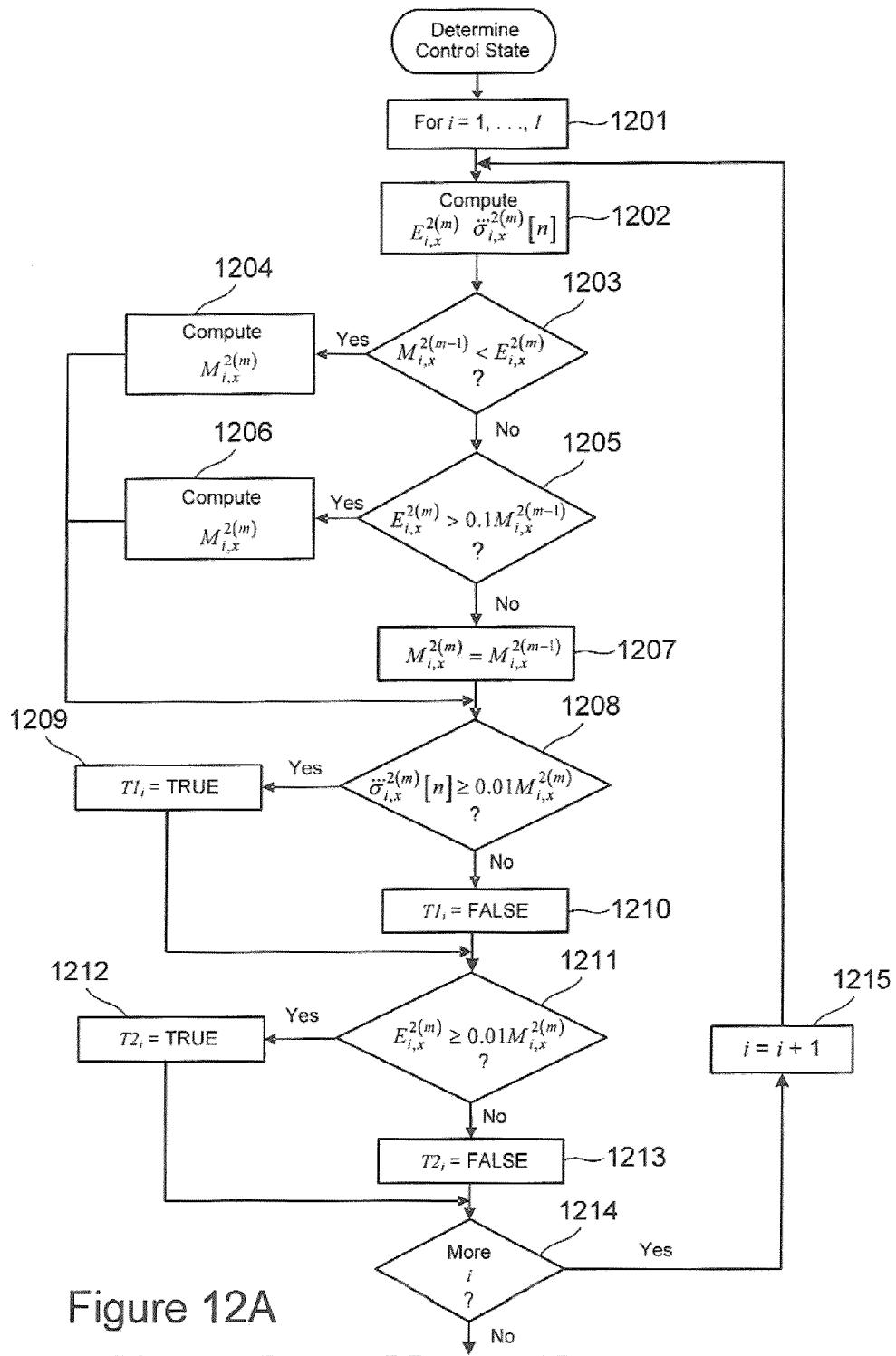
FIGS. 12A-12C show a control-flow diagram for the routine "determine control state" called in step 1108 in FIG. 11 and represents an embodiment of the present invention.
Figure 12B:
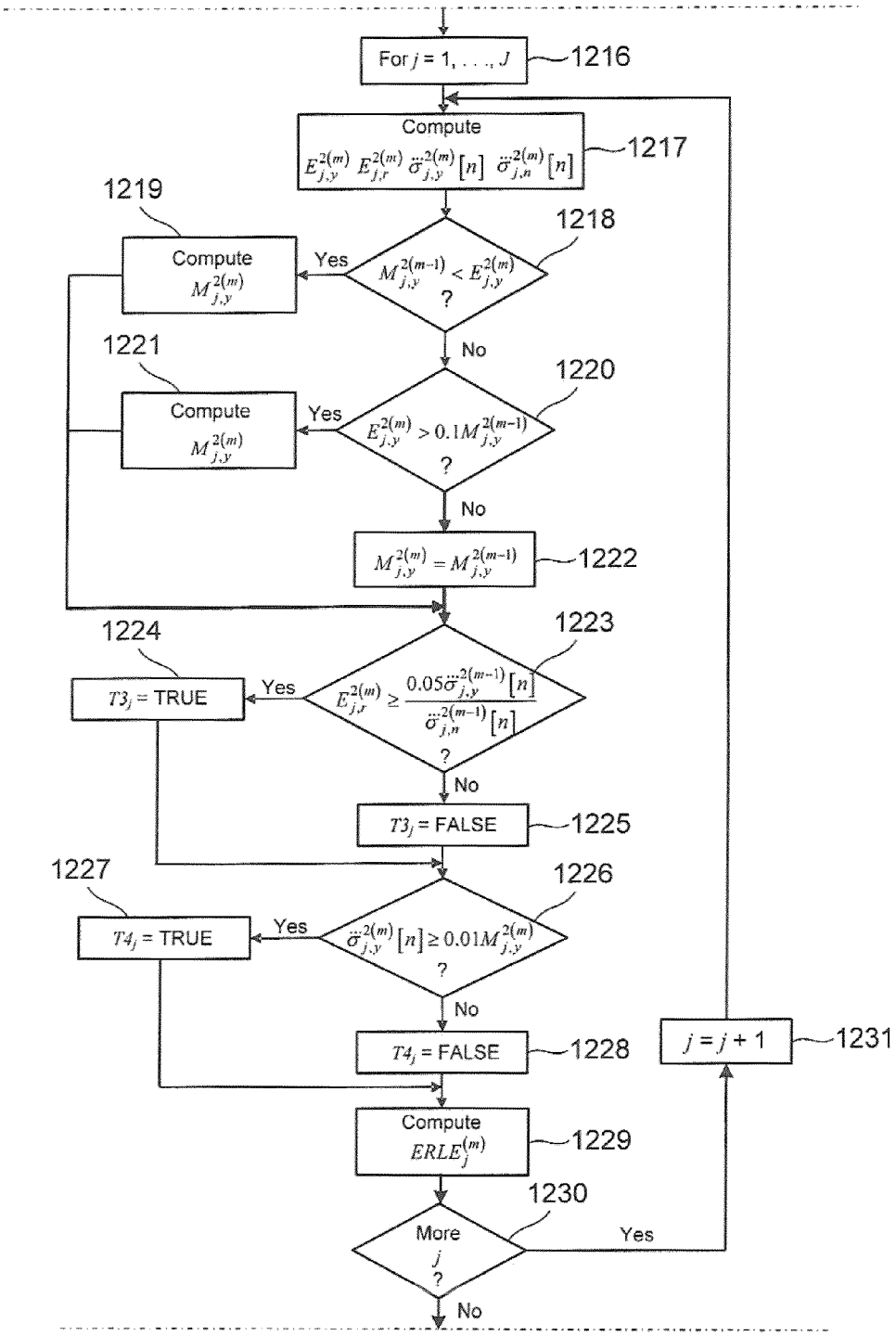
Figure 12C:
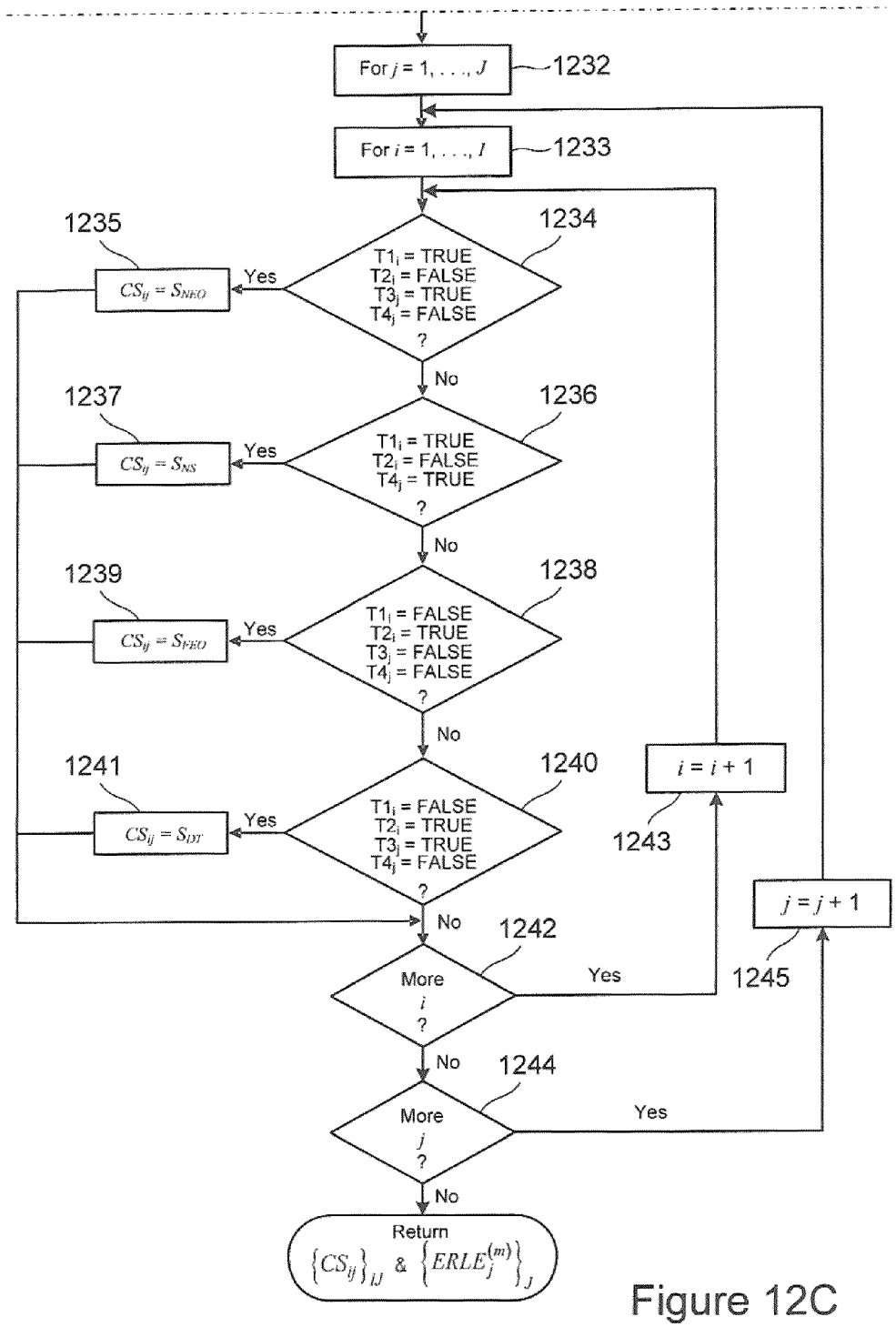

FIGS. 12A-12C show a control-flow diagram for the routine "determine control state" called in step 1108 in FIG. 11 and represents an embodiment of the present invention. In the for-loop beginning in step 1201 of FIG. 12A, steps 1202-1214 are repeated for each index i∈{1, . . . , I}. In step 1202, an average square energy associated with the vector $\vec{x}_i^{(m)}[n]$ is computed as follows:

$$E_{i,x}^{2(m)} = \|\vec{x}_i^{(m)}[n]\|^2,$$

and a long-term energy variances is recursively determined for the average square energies by:

$$\ddot{\sigma}_{i,x}^{2(m)}[n] = 0.99 \ddot{\sigma}_{i,x}^{2(m-1)}[n] + 0.01 E_{i,x}^{2(m)}$$

In steps 1203-1207, a maximum square energy $M_{i,x}^{2\,(m)}$ associated with the digital signal vector $\vec{x}_i^{(m)}[n]$ is determined. In step 1203, when the maximum square energy $M_{i,x}^{2\ (m-1)}$ is less than the average square energy $E_{i,x}^{2\ (m)}$ control passes to step 1204, otherwise control passes to step 1205. In step 1204, the maximum square energy is computed by:

$$M_{i,x}^{2(m)} = \min\{E_{i,x}^{2(m)}, 10 M_{i,x}^{2(m-1)}\}$$

and control passes to step 1208. In step 1205, when the average square energy $E_{i,x}^{2\ (m)}$ is greater than $0.1 M_{i,x}^{2\ (m-1)}$ control passes to step 1206, otherwise control passes to step 1207. In step 1206, the maximum square energy is computed by:

$$M_{i,x}^{2(m)} = 0.999 M_{i,x}^{2(m-1)} + 0.001 E_{i,x}^{2(m)}$$

and control passes to step 1208. In step 1207, the maximum square energy $M_{i,x}^{2\ (m)}$ is assigned the value of $M_{i,x}^{2\ (m-1)}$ from the previous decision period. In steps 1208-1213, Boolean logic values "TRUE" and "FALSE" are assigned to Boolean variables $T1_i$, $T2_i$. In step 1208, when the long-term variance $\ddot{\sigma}_{i,x}^{2(m)}[n]$ is greater than or equal to $0.01 M_{i,x}^{2\ (m)}$, control passes to step 1209 and $T1_i$ is set to "TRUE," otherwise control passes to step 1210 and $T1_i$ is set to "FALSE." In step 1211, when the average square energy $E_{i,x}^{2\ (m)}$ is greater than or equal to $0.01 M_{i,x}^{2\ (m)}$, control passes to step 1212 and $T2_i$ is set to "TRUE," otherwise control passes to step 1214 and $T2_i$ is set to "FALSE." In step 1214, when i is greater than I control passes to step 1216, in FIG. 12B, otherwise control passes to step 1215. In step 1215, i is incremented by "1" and steps 1202-1214 are repeated.

In the for-loop beginning in step 1216 of FIG. 12B, steps 1217-1231 are repeated for each index $j \in \{1, \ldots, J\}$. In step 1216, average energies are computed for $\vec{y}_j^{(m)}[n]$, $\hat{\vec{r}}_j^{(m)}[n]$, and a shadow-error vector $\tilde{\vec{r}}_j^{(m)}[n]$ as follows:

$$E_{j,y}^{2(m)} = \|\vec{y}_j^{(m)}[n]\|^2,$$

$$E_{j,\hat{r}}^{2(m)} = \|\hat{\vec{r}}_j^{(m)}[n]\|^2,$$

and $$E_{j,\tilde{r}}^{2(m)} = \|\tilde{\vec{r}}_j^{(m)}[n]\|^2$$

and long-term energy variances are recursively determined for the average square energies by:

$$\ddot{\sigma}_{j,y}^{2(m)}[n] = 0.99 \ddot{\sigma}_{j,y}^{2(m-1)}[n] + 0.01 E_{j,y}^{2(m)},$$

and $$\ddot{\sigma}_{j,n}^{2(m)}[n] = 0.99 \ddot{\sigma}_{j,n}^{2(m-1)}[n] + 0.01 E_{j,\hat{r}}^{2(m)}$$

In steps 1218-1222, a maximum square energy $M_{i,y}^{2\ (m)}$ associated with the digital signal vector $\vec{y}_i^{(m)}[n]$ is determined. In step 1218, when the maximum square energy $M_{i,y}^{2\ (m-1)}$ is less than the average square energy $E_{i,y}^{2\ (m)}$ control passes to step 1219, otherwise control passes to step 1220. In step 1219, the maximum square energy is computed by:

$$M_{i,y}^{2(m)} = \min\{E_{i,y}^{2(m)}, 10 M_{i,y}^{2(m-1)}\}$$

and control passes to step 1223. In step 1220, when the average square energy $E_{i,y}^{2\ (m)}$ is greater than $0.1 M_{i,y}^{2\ (m-1)}$ control passes to step 1221, otherwise control passes to step 1221. In step 1221, the maximum square energy is computed by:

$$M_{i,y}^{2(m)} = 0.999 M_{i,y}^{2(m-1)} + 0.001 E_{i,y}^{2(m)}$$

and control passes to step 1223. In steps 1223-1228, Boolean logic values "TRUE" and "FALSE" are assigned to Boolean variables $T3_j$, $T4_j$. In step 1223, when the average square energy $E_{j,\hat{r}}^{2\ (m)}$ is greater than or equal to $0.05 \ddot{\sigma}_{j,y}^{2(m-1)}[n]/$ $\ddot{\sigma}_{j,n}^{2(m-1)}[n]$, control passes to step 1224 and $T3_j$ is set to "TRUE," otherwise control passes to step 1225 and $T3_j$ is set to "FALSE." In step 1226, when the long-term variance $\ddot{\sigma}_{j,y}^{2(m)}[n]$ is greater than or equal to $0.01 M_{j,y}^{2\ (m)}$, control passes to step 1227 and $T4_j$ is set to "TRUE," otherwise control passes to step 1228 and $T4_j$ is set to "FALSE." In step 1229, an echo return loss enhancement value ("ERLE") is calculated according to:

$$ERLE_j^{(m)} = 10 \log_{10}\left(\frac{\dot{\sigma}_{j,y}^{2(m)}[n]}{\dot{\sigma}_{j,\hat{r}}^{2(m)}[n]}\right)$$

where $$\dot{\sigma}_{j,y}^{2(m)}[n] = 0.8 \dot{\sigma}_{j,y}^{2(m-1)}[n] + 0.2 E_{j,y}^{2(m)},$$

and $$\dot{\sigma}_{j,\hat{r}}^{2(m)}[n] = 0.8 \dot{\sigma}_{j,\hat{r}}^{2(m-1)}[n] + 0.2 E_{j,\hat{r}}^{2(m)}$$

are short-term variances associated with the average square energies $E_{i,x}^{2\ (m)}$ and $E_{j,\hat{r}}^{2\ (m)}$, respectively. The ERLE can be used to gauge the performance of acoustic echo cancellation when the system is in the state $S_{FEO}$ and determine approximate-impulse-response vectors when the system is in double talk described below in step 1309 of FIG. 13A. In step 1230, when j is greater than J control passes to step 1232, in FIG. 12C, otherwise control passes to step 1231. In step 1231, j is incremented by "1" and steps 1217-1230 are repeated.

In the for-loop beginning in step 1232 of FIG. 12C, steps 1233-1245 are repeated for each $j \in \{1, \ldots, J\}$. In the for-loop beginning in step 1233, steps 1234-1243 are repeated for each $i \in \{1, \ldots, I\}$. In steps 1234-1241, the Boolean logic values determined in steps 1208-1213 in FIG. 12A and steps 1223-1228 in FIG. 12B are used to determine a control state $CS_{ij}$ for each echo path. In step 1234, when $T1_i$ and $T3_j$ are "TRUE," and $T2_i$ and $T4_j$ are "FALSE," control passes to step 1235 and $CS_{ij}$ is assigned $S_{NEO}$, otherwise control passes to step 1236. In step 1236, when $T1_i$ and $T4_j$ are "TRUE," and $T2_i$ is "FALSE," control passes to step 1237, and $CS_{ij}$ is assigned $S_{NS}$, otherwise control passes to step 1238. In step 1238, when $T2_i$ is "TRUE" and $T1_i$, $T3_j$, and $T4_j$ are "FALSE," control passes to step 1239, and $CS_{ij}$ is assigned $S_{FEO}$, otherwise control passes to step 1240. In step 1240, when $T2_i$ and $T3_j$ are "TRUE," and $T1_i$ and $T4_j$ are "FALSE," control passes to step 1241, and $CS_{ij}$ is assigned $S_{DT}$, otherwise control passes to step 1242. In step 1242, when i is greater than I control passes to step 1244, otherwise control passes to step 1243. In step 1243, i is incremented by "1" and steps 1234-1242 are repeated. In step 1244, when j is greater than J. $\{CS_{ij}\}_{I,J}$ and $\{ERLE_j^m\}_J$ are returned, otherwise, in step 1245, j is incremented by "1" and steps 1233-1244 are repeated.

Figure 13:
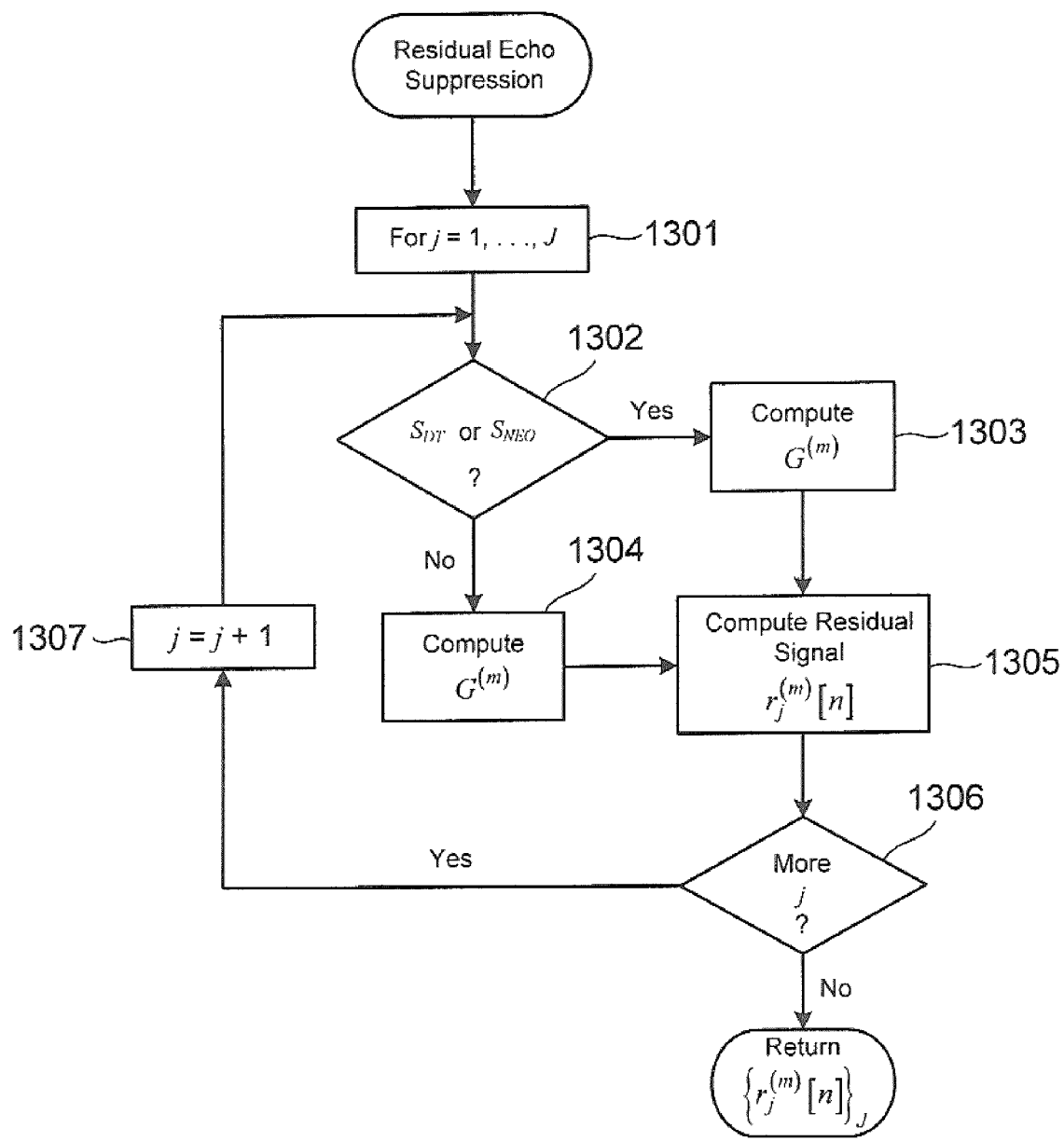
FIG. 13 is a control-flow diagram for the routine "residual echo suppression" called in step 1109 in FIG. 11 and represents an embodiment of the present invention.

FIG. 13 is a control-flow diagram for the routine "residual echo suppression" called in step 1009 in FIG. 10 and represents an embodiment of the present invention. In the for-loop beginning in step 1301, steps 1302-1307 are repeated for each index j. The control states of the audio transmission are used to correct for gain in each of the processed digital signals $\{r_j^{(m)}[n]\}_J$. For example, during double-talk, or when an audio signal is produced in the near room 102 only, the gain acquired by the controlled digital signals $\{\hat{r}_j^{(m)}[n]\}_J$ is larger than when an audio signal is produced only in the far room 104 or when there is no audio signal transmitted at all. The maximum and minimum amounts of gain that the controlled digital signal can acquire are represented by the constants $G_{max}$ and $G_{min}$, respectively. Steps 1302-1305 adjust the gain in each of the processed digital signals $\{r_j^{(m)}[n]\}_J$. In step 1302, when there is double talk or sound produced in the near room 102 only, control passes to step 1303, otherwise control passes to step 1304. In step 1303, the gain is computed as follows:

$$G^{(m)}=K_2 G^{(m-1)}+(1-K_2)G_{max}$$

where $K_2$ is a weight assigning a lower relative importance to $G^{(m-1)}$ than to the maximum gain $G_{max}$. In step 1304, the gain is computed as follows:

$$G^{(m)}=K_1 G^{(m-1)}+(1-K_1)G_{min}$$

where $K_1$ is a weight assigning a relatively higher importance to $G^{(m-1)}$ than to the minimum gain $G_{min}$. In step 1305, the jth processed digital signal is determined by:

$$r_j^{(m)}[n]=G^{(m)}\hat{r}_j^{(m)}[n]$$

In step 1306, when j is less than or equal to J, control passes to step 1307 and j is incremented by "1," otherwise processed digital signals $\{r_j^{(m)}[n]\}_J$ are returned.

Figure 14A:
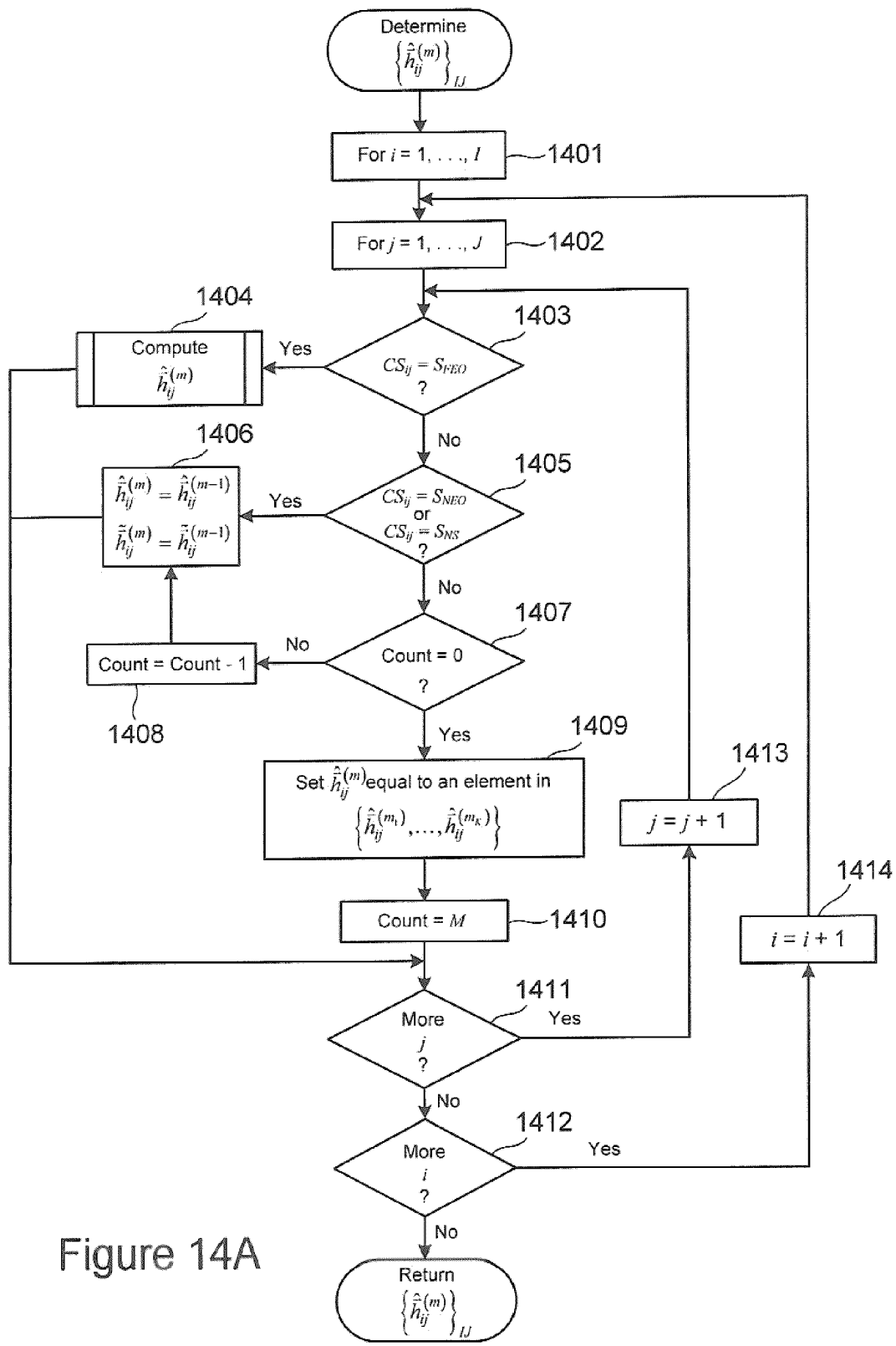
FIG. 14A is a control-flow diagram for the routine "determine $\{\vec{\hat{h}}_{ij}^{(m)}\}_{IJ}$" called in step 1115 in FIG. 11 and represents an embodiment of the present invention.

FIG. 14A is a control-flow diagram for the routine "determine $\{\hat{\vec{h}}_{ij}^{(m)}\}_{IJ}$" called in step 1115 in FIG. 11 and represents an embodiment of the present invention. In the for-loop beginning in step 1402, steps 1402-1413 are repeated for each $i \in \{1, \ldots, I\}$. In the for-loop beginning in step 1402, steps 1403-1411 are repeated for each $j \in \{1, \ldots J\}$. In step 1403, when the $CS_{ij}$ is $S_{FEO}$, control passes to step 1404, otherwise control passes to step 1405. In step 1404, the routine "compute $\hat{\vec{h}}_{ij}^{(m)}$" is called and an approximate-impulse-response vector $\hat{\vec{h}}_{ij}^{(m)}$ is computed. In step 1405, when the $CS_{ij}$ is $S_{NEO}$ or $S_{NS}$, control passes to step 1406, otherwise control passes to step 1407. In step 1406, the impulse-response vector is updated by assigning elements in the vector $\hat{\vec{h}}_{ij}^{(m)}$ to corresponding values in the previous impulse response $\hat{\vec{h}}_{ij}^{(m-1)}$, and the shadow-impulse-response vector is updated by assigning elements in the shadow-impulse-response vector $\tilde{\vec{h}}_{ij}^{(m)}$ to corresponding elements in the shadow-impulse-response vector $\tilde{\vec{h}}_{ij}^{(m-1)}$ from the previous decision period. Steps 1407, 1408, and 1409 are used to guard against misinterpreting the presence of double talk as described below with reference to FIGS. 14B-14C. In step 1407, when "count" does not equal "0," control passes to step 1407, otherwise control passes to step 1409. In step 1408, the "count" is decremented by "1" and control passes to step 1406. In step 1409, the approximate-impulse-response vector $\hat{\vec{h}}_{ij}^{(m)}$ for double talk is selected form an impulse-response data structure represented by a set $\{\hat{\vec{h}}_{ij}^{(m_1)}, \ldots, \hat{\vec{h}}_{ij}^{(m_K)}\}$. In step 1410, the "count" is assigned the value M. The value M can be 10, 12, 15, 18, or any other suitable value. In step 1411, when j is greater than J, control passes to step 1412, otherwise control passes to step 1413. In step 1413, j is incremented by "1" and steps 1403-1410 are repeated. In step 1412, when i is greater than I, the set of approximate impulse response vectors $\{\hat{\vec{h}}_{ij}^{(m)}\}_{IJ}$ is returned, otherwise control passes to step 1414 and i is incremented by "1."

Note that there are I×J impulse-response data structures, one impulse-response data structure for each different echo path. Each data structure includes the K most recent approximate impulse responses with the highest signal to noise ratio. The subscripts on the decision epochs m correspond to the order in which the impulse response vectors have been added to the data structure. For example, in the data structure in step 1409, the impulse response vector $\hat{\vec{h}}_{ij}^{(m_K)}$ has been in the data structure the longest, and the impulse response vector $\hat{\vec{h}}_{ij}^{(m_1)}$ is the most recent addition to the data structure. Note that the approximate-impulse-response vector is not updated during double talk because during double talk the signal-to-noise ratio decreases rapidly. The increased noise distorts the approximate-impulse-response vector. In order to avoid this distortion, the approximate-impulse-response vector $\hat{\vec{h}}_{ij}^{(m)}$ is selected from the corresponding impulse-response data structure. In various embodiments of the present invention, the approximate-impulse-response vector can be selected based on any number of different criteria. For example, in one embodiment of the present invention, an approximate-impulse-response vector can be selected in step 1409 according to which impulse-response vector has the largest corresponding $ERLE_j^{(m_i)}$. In another embodiment of the present invention, in step 1409, the approximate-impulse-response vector can be selected from the corresponding data structure based on which approximate-impulse-response vector has been in the data structure the longest, which is $\hat{\vec{h}}_{ij}^{(m_K)}$.

Figure 14B:
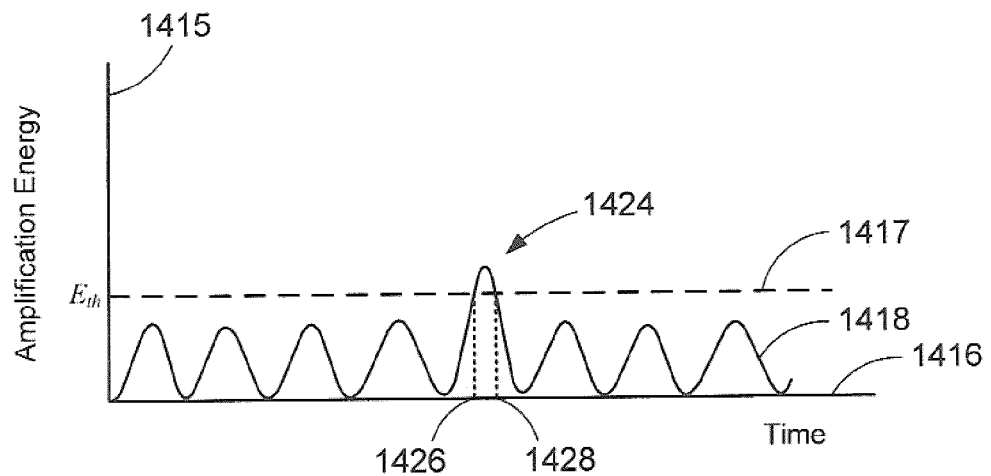
FIGS. 14B-14C shows two plots of amplification energy versus time for the four types of control states that represents an embodiment of the present invention.
Figure 14C:
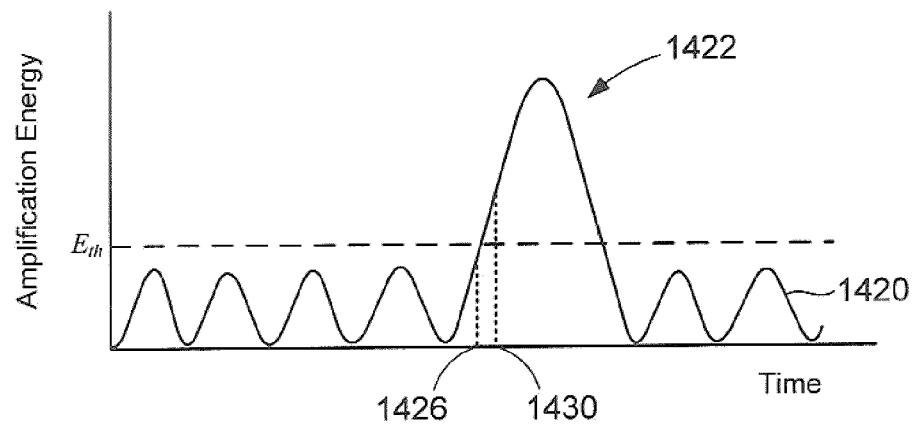

In the control-flow diagram of FIG. 14A, the steps 1407, 1408, and 1406 are repeated for M iterations in order avoid misinterpreting noises transmitted in a corresponding echo paths as $S_{DT}$. FIGS. 14B-14C shows two plots of amplification energy versus time for the four types of control states that represents an embodiment of the present invention. In FIGS. 14B-14C, vertical axes, such as vertical axis 1415, represent amplification energy associated with signals transmitted between the near room 102 and the far room 104, horizontal axes, such as horizontal axis 1416, represent time, and horizontal dashed lines, such as dashed line 1417, correspond to a double talk threshold energy, $E_{th}$. Curves 1418 and 1420 represent the amplification energies associated with signals transmitted between the near room 102 and the far room 104. Amplification energies below the double talk threshold $E_{th}$ correspond to an $S_{FEO}$, $S_{NEO}$, or $S_{NS}$ control state. Peak 1422 corresponds to amplification energy resulting from double talk, which exceeds the double talk threshold $E_{th}$. However, peak 1424 corresponds to an echo path noise produced in the near room 102 or the far room 104. This noise initially creates the appearance of double talk because the amplification energy exceeds the double talk threshold energy $E_{th}$ even though double talk is not actually taking place. In order to avoid misinterpreting short duration noises as double talk, at time 1426, a countdown begins with the variable "count," described with reference to steps 1406, 1407, and 1405, which avoids selecting an approximate-impulse-response vector from the data structure $\{\hat{\vec{h}}_{ij}^{(m_1)}, \ldots, \hat{\vec{h}}_{ij}^{(m_K)}\}$ in step 1408 until double talk has been confirmed for M iterations. In other words, the method of the present invention continues operating as if double talk has not occurred for M decision periods. If after M iterations the amplification energy has decreased, as indicated at time 1428 in FIG. 14B, inappropriate selection of an approximate-impulse-response vector for double talk has been avoided. On the other hand, if after M iterations the amplification energy has increased, as indicated the curve 1420 at time 1430 in FIG. 14C, an approximate impulse-response for double talk is selected in step 1409.

Figure 15:
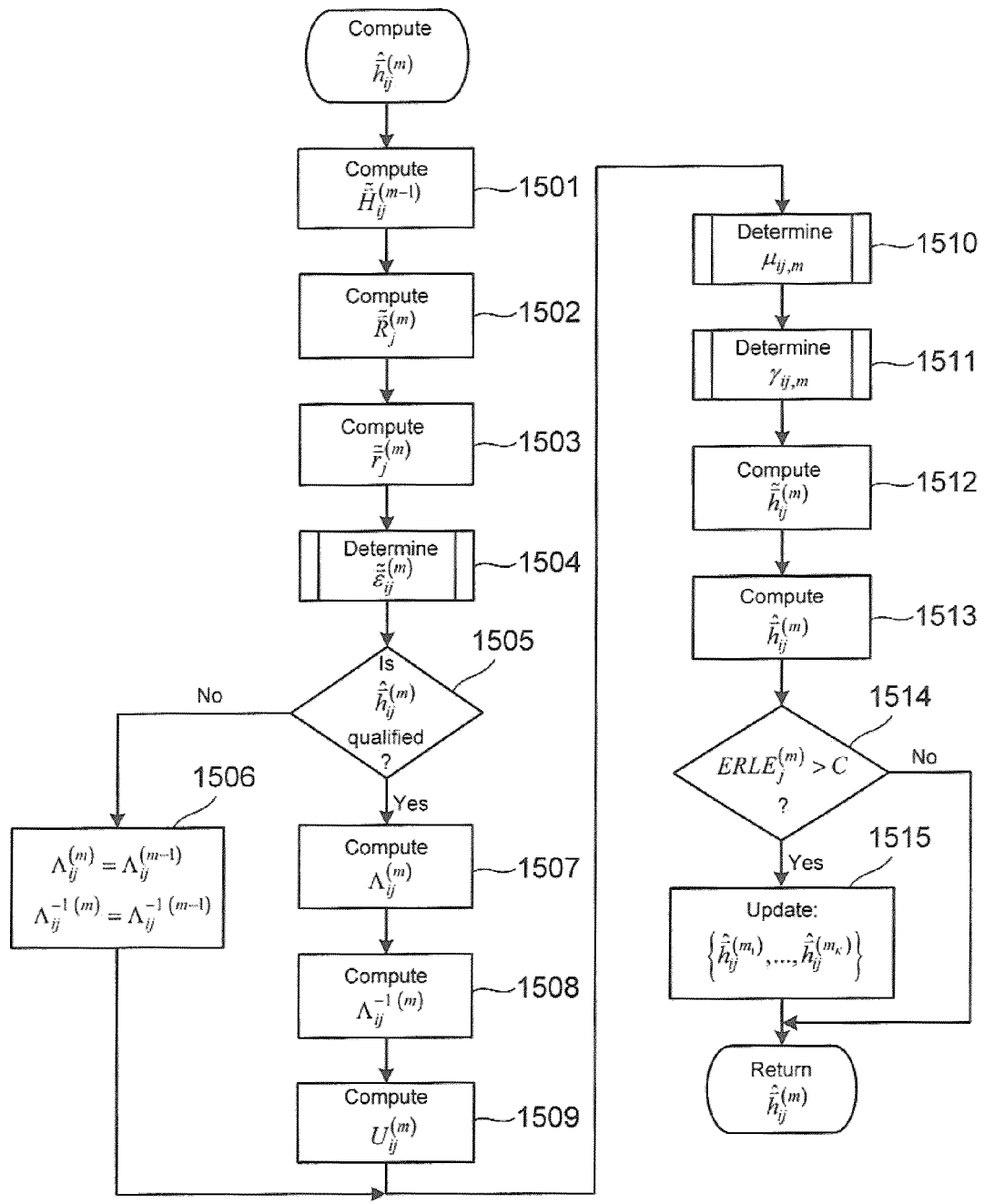
FIG. 15 is a control-flow diagram for the routine "compute $\vec{\hat{h}}_{ij}^{(m)}$" called in step 1404 in FIG. 14 and represents an embodiment of the present invention.

The methods now described with reference to FIGS. 15-18 are repeated for each echo path. FIG. 15 is a control-flow diagram for the routine "compute $\hat{\vec{h}}_{ij}^{(m)}$" called in step 1404 in FIG. 14 and represents an embodiment of the present invention. In step 1501, the FFT is applied to the shadow impulse-response vector $\tilde{\vec{h}}_{ij}^{(m-1)}$ in order to obtain a frequency domain dependent vector:

$$\tilde{\hat{H}}_{ij}^{(m-1)} = \begin{bmatrix} \tilde{\hat{H}}_{ij}^{(m-1)}[0] \\ \tilde{\hat{H}}_{ij}^{(m-1)}[1] \\ \vdots \\ \tilde{\hat{H}}_{ij}^{(m-1)}[N-1] \end{bmatrix}$$

$$= FFT \left\{ \begin{bmatrix} \tilde{\hat{h}}_{ij}^{(m-1)}[n] \\ \tilde{\hat{h}}_{ij}^{(m-1)}[n-1] \\ \vdots \\ \tilde{\hat{h}}_{ij}^{(m-1)}[n-(L-1)] \end{bmatrix} \right\}$$

In step 1502, a frequency domain, shadow-error vector is computed as follows:

$$\tilde{\vec{R}}_{j}^{(m)} = FFT \cdot Tr_P \cdot IFFT \left\{ \tilde{\vec{Y}}_{j}^{(m)} - \sum_{i=1}^{I} \left( \tilde{\vec{X}}_{i}^{(m)} \circ (\tilde{\hat{H}}_{ij}^{(m-1)})^* \right) \right\}$$

where
$Tr_P$ is a truncation operator of length P, and $$\tilde{\vec{R}}_{j}^{(m)} = \begin{bmatrix} \tilde{R}_{j}^{(m)}[0] \\ \tilde{R}_{j}^{(m)}[1] \\ \vdots \\ \tilde{R}_{j}^{(m)}[N-1] \end{bmatrix}$$

In step 1503, an IFFT is applied to the frequency domain, shadow-error vector in order to obtain a shadow-error vector:

$$\tilde{\vec{r}}_{j}^{(m)} = FFT \{ \tilde{\vec{R}}_{j}^{(m)} \}$$

In step 1504, the routine "determine $\vec{\epsilon}_{ij}^{(m)}$" is called to calculate a shadow mismatch vector $\vec{\epsilon}_{ij}^{(m)}$. In step 1505, when the ij echo path in the room has change, such as by closing a door or moving furniture, proceed to step 1507, and $\hat{\vec{h}}_{ij}$ is said to be "qualified." Otherwise, proceed to step 1506. In step 1506, set the matrices $$\Lambda_{ij}^{(m)} = \Lambda_{ij}^{(m-1)},$$

$$\Lambda_{ij}^{-1(m)} = \Lambda_{ij}^{-1(m-1)},$$

and $$U_{ij}^{(m)} = U_{ij}^{(m-1)}$$

In step 1507, compute the matrix:

$$\Lambda_{ij}^{(m-1)} = \frac{m-1}{m} \Lambda_{ij}^{(m-1)} + \frac{1}{m} \hat{\vec{h}}_{ij}^{(m-1)} (\hat{\vec{h}}_{ij}^{(m-1)})^T$$

In step 1508 compute the vector and inverse matrix:

$$\vec{g}_{ij}^{(m|m-1)} = \frac{m}{m-1} \Lambda_{ij}^{-1(m-1)} \hat{\vec{h}}_{ij}^{(m-1)}, \text{ and}$$

$$\Lambda_{ij}^{-1(m)} = \frac{m}{m-1} \Lambda_{ij}^{-1(m-1)} + \frac{\vec{g}_{ij}^{(m|m-1)} (\vec{g}_{ij}^{(m|m-1)})^T}{m + (\hat{\vec{h}}_{ij}^{(m-1)})^T \vec{g}_{ij}^{(m|m-1)}}$$

In step 1509 compute the singular value decomposition of the matrix $\Lambda hd_{ij}^{(m)}$ to obtain:

$$\Lambda_{ij}^{(m)} = \begin{bmatrix} U_{ij}^{(m)} & V_{ij}^{(m)} \end{bmatrix} \begin{bmatrix} \sum_{ij}^{(m)} & 0 \\ 0 & \Delta_{ij}^{(m)} \end{bmatrix} \begin{bmatrix} U_{ij}^{T(m)} \\ V_{ij}^{T(m)} \end{bmatrix}$$

in which the dimension of $U_{ij}^{(m)}$ is L×d where L is the length of $\hat{\vec{h}}_{ij}$. Let the singular values of $\Lambda_{ij}^{(m)}$ be ordered decreasingly as, $$\lambda_1 \geq \lambda_2 \geq \ldots \geq \lambda_L$$

The parameter d is obtained by:

$$d = \max \left\{ \frac{L}{4}, \max\{k: \lambda_k \geq \alpha \lambda_1\} \right\}$$

for an arbitrary parameter $0 \leq \alpha \leq 1$. In step 1510, the matrix $\Lambda_{ij}^{-1\,(m)}$ is used to compute the shadow update step size $\mu_{ij,m}$ in the routine "determine $\mu_{ij,m}$" called in step 1510. The matrix $\Lambda_{ij}^{-1\,(m)}$ is also used to compute the adaptation step size $\gamma_{ij,m}$ in the routine "determine $\gamma_{ij,m}$" called in step 1511. In step 1512, the shadow mismatch vector $\vec{\epsilon}_{ij}^{(m)}$, determined in step 1504, and the shadow update step size $\mu_{ij,m}$, determined in step 1510, are used to recursively compute a shadow-impulse-response vector:

$$\tilde{\vec{h}}_{ij}^{(m)} = \tilde{\vec{h}}_{ij}^{(m-1)} + \mu_{ij,m} \vec{\epsilon}_{ij}^{(m)}$$

In step 1513, the adaptation step size $\gamma_{ij,m}$ and the matrix $U_{ij}^{(m)}$ are used to recursively compute the approximate-impulse-response vector as follows:

$$\hat{\vec{h}}_{ij}^{(m)} = (1 - \gamma_{ij,m}) \hat{\vec{h}}_{ij}^{(m-1)} \gamma_{ij,m} U_{ij}^{T(m)} [U_{ij}^{T(m)} \tilde{\vec{h}}_{ij}^{(m)}]$$

The parameter $\gamma_{ij,m}$ is used as a weighting factor. In step 1514, when the $ERLE_j^{(m)}$ is greater than a threshold value C, control passes to step 1515. The threshold value C can be 10, 12, 15, or any other suitable value for weighting the approximate-impulse-response vector $\hat{\vec{h}}_{ij}^{(m)}$. In step 1515, the impulse-response data structure described above with reference to step 1409, in FIG. 14A:

$$\{\hat{\vec{h}}_{ij}^{(m1)}, \hat{\vec{h}}_{ij}^{(m2)}, \ldots, \hat{\vec{h}}_{ij}^{(mK-1)}, \hat{\vec{h}}_{ij}^{(mK)}\}$$

is updated.

The impulse-response vectors are arranged in the impulse-response data structure in order of increasing decision epoch values as follows $m_1 > m_2 > \ldots > m_{K-1} > m_K$, where the decision epoch $m_K$ corresponds to an approximate-impulse-response vector that has been in the data structure for the longest period of time, and the decision epoch $m_1$ corresponds to the most recent approximate-impulse-response vector added to the data structure. In one embodiment of the present invention, the data structure can be updated in step 1515 by removing the impulse-response vector $\hat{\vec{h}}^{(m_K)}$ from the data structure and adding the most recently computed impulse-response vector $\vec{\tilde{h}}_{ij}^{(m)}$ to the data structure computed in step 1513, which gives the impulse response data structure:

$$\{\vec{\tilde{h}}_{ij}^{(m)}, \vec{\tilde{h}}_{ij}^{(m1)}, \ldots, \vec{\tilde{h}}_{ij}^{(mK-2)}, \vec{\tilde{h}}_{ij}^{(mK-1)}\}$$

In other embodiments of the present invention, the data structure can be updated in step 1513 according to the magnitude of the ERLE values associated with each approximate-impulse-response vector. For example, the approximate-impulse-response vector with the smallest associated ERLE value is removed from the data structure in order to accommodate the addition of the most recently computed approximate-impulse-response vector computed in step 1513 and have an ERLE satisfying the threshold condition in step 1514.

The shadow update step size $\mu_{ij,m}$ determined by the routine "determine $\mu_{ij,m}$" called in the step 1510 substantially ensures that the shadow-impulse-response vector $\vec{\tilde{h}}_{ij}^{(m)}$ determined in the step 1512 lies within an evolving model of the impulse response space.

Figure 16:
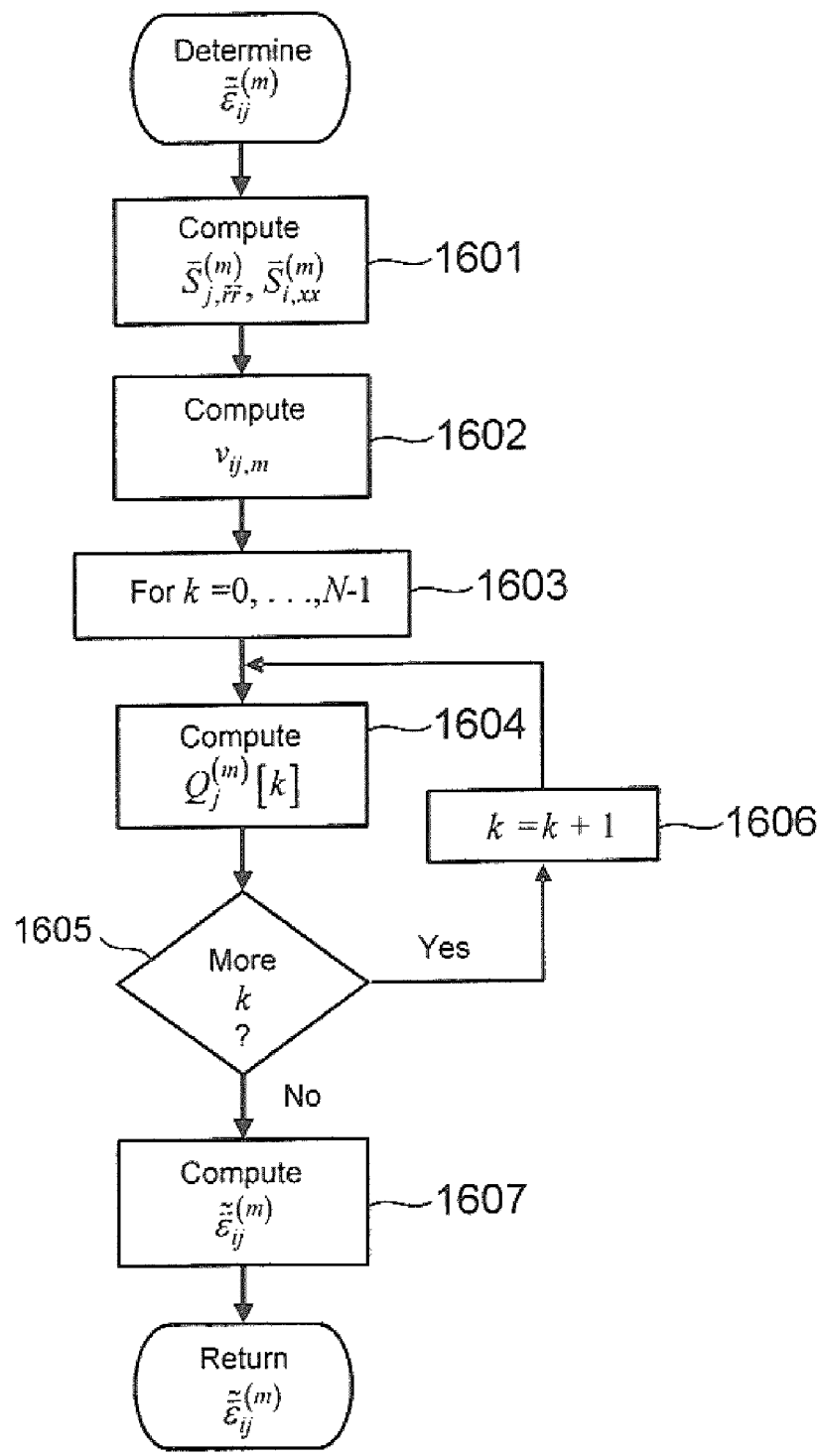
FIG. 16 is a control-flow diagram for the routine "determine $\vec{\epsilon}_{ij}^{(m)}$" called in step 1504 in FIG. 15 and represents an embodiment of the present invention.

FIG. 16 is a control-flow diagram for the routine "determine $\vec{\tilde{\epsilon}}_{ij}^{(m)}$" called in step 1504 in FIG. 15 and represents an embodiment of the present invention. In step 1601, an average spectrum of the frequency domain vector $\vec{X}_j^{(m)}$ is computed as follows:

$$\vec{S}_{i,xx}^{(m)} = (1-\beta)\vec{S}_{i,xx}^{(m-1)} + \beta \vec{X}_i^{(m)} \cdot \vec{X}_i^{(m)}$$

and an average spectrum of the frequency domain shadow-error vector $\vec{\tilde{R}}_j^{(m)}$ is computed as follows:

$$\vec{S}_{j,\tilde{r}\tilde{r}}^{(m)} = (1-\beta)\vec{S}_{j,\tilde{r}\tilde{r}}^{(m-1)} + \beta \vec{\tilde{R}}_j^{(m)} \circ \vec{\tilde{R}}_j^{(m)}$$

where $$\vec{S}_{i,xx}^{(m)} = \begin{bmatrix} S_{i,xx}^{(m)}[0] \\ S_{i,xx}^{(m)}[1] \\ \vdots \\ S_{i,xx}^{(m)}[N-1] \end{bmatrix}, \text{ and}$$

$$\vec{S}_{j,rr}^{(m)} = \begin{bmatrix} S_{j,rr}^{(m)}[0] \\ S_{j,rr}^{(m)}[1] \\ \vdots \\ S_{j,rr}^{(m)}[N-1] \end{bmatrix}$$

The parameter $\beta$ is a weighting factor. In step 1602, the maximum energies computed in FIG. 11 are used to determine:

$$v_m = \frac{\sum_{i=1}^{I} M_{i,x}^{2(m)}}{\sum_{j=i}^{J} M_{i,y}^{2(m)}}$$

In steps 1603-1606, elements of an N-component, frequency domain, preconditioning vector $\vec{Q}_j^{(m)}$ are determined. In the for-loop beginning in step 1603, steps 1604-1606 are repeated for each frequency domain index k. In step 1604, the elements of the preconditioning vector $\vec{Q}_j^{(m)}$ are calculated as follows:

$$Q_j^{(m)}[k] = \frac{1}{\max\left\{\sum_{i=1}^{I} S_{i,xx}^{(m)}[k] + v_m S_{j,\tilde{r}\tilde{r}}^{(m)}[k], \lambda\right\}}$$

where k ranges from 0 to N−1. In step 1605, when k is less than N−1, control passes to step 1606, otherwise control passes to step 1607. In step 1606, the index k is incremented by the value "1." In step 1607, the vector $\vec{\tilde{\epsilon}}_{ij}^{(m)}$ is computed as follows:

$$\vec{\tilde{\epsilon}}_{ij}^{(m)} = Tr_L \cdot \text{IFFT}\{\vec{Q}_j^{(m)} \cdot \vec{X}_i^{(m)} \cdot (\vec{\tilde{R}}_j^{(m)})^*\}$$

where $Tr_L$ is a truncation operator of size L, and $$\vec{\tilde{\epsilon}}_{ij}^{(m)} = \begin{bmatrix} \tilde{\epsilon}_{ij}[0] \\ \tilde{\epsilon}_{ij}[1] \\ \vdots \\ \tilde{\epsilon}_{ij}[L-1] \end{bmatrix}$$

Figure 17:
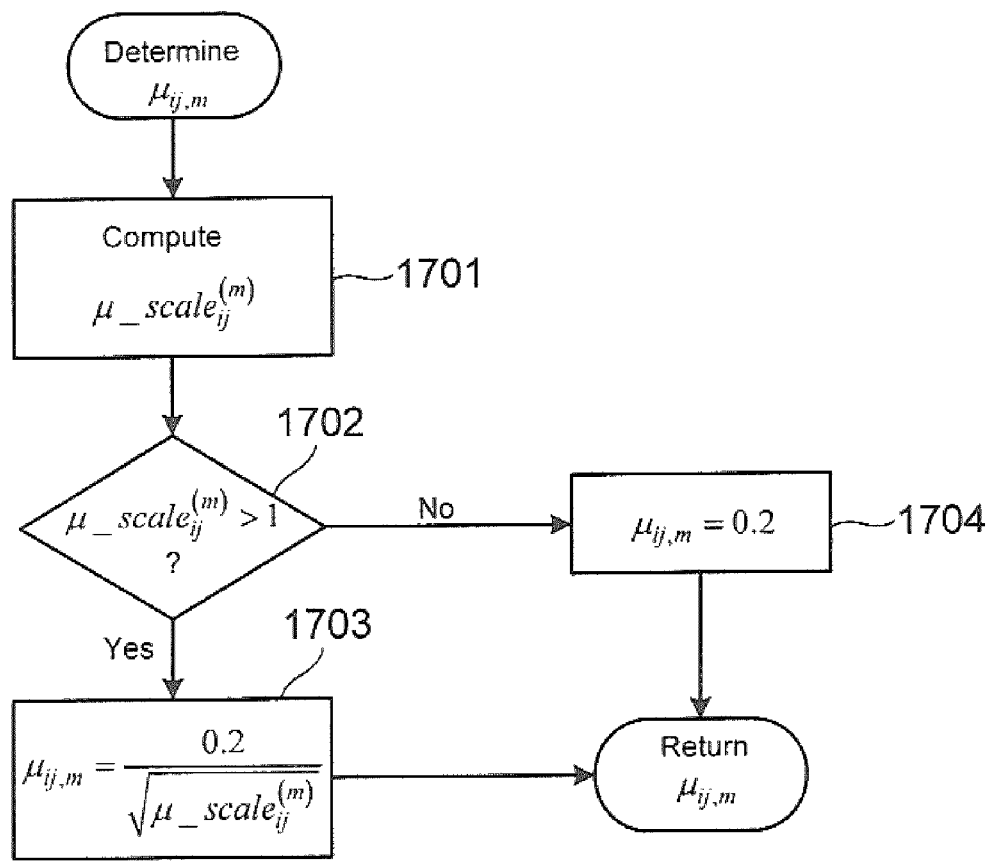
FIG. 17 is a control-flow diagram for the routine "determine $\mu_{ij,m}$" called in step 1510 in FIG. 15 that represents an embodiment of the present invention.

FIG. 17 is a control-flow diagram for the routine "determine $\mu_{ij,m}$" called in step 1510 in FIG. 15 that represents an embodiment of the present invention. In step 1701, a parameter $\mu\_\text{scale}_{ij}^{(m)}$ is computed as follows:

$$\mu\_\text{scale}_{ij}^{(m)} = \frac{\hat{\vec{h}}_{ij}^{(m)} \Lambda_{ij}^{-1(m)} (\hat{\vec{h}}_{ij}^{(m)})^T}{L}$$

In step 1702, when $\mu\_\text{scale}_{ij}^{(m)}$ is greater than the value "1," control passes to step 1703, otherwise control passes to step 1704. In step 1703, $\mu_{ij,m}$ is assigned the value $0.2/\sqrt{\mu\_\text{scale}_{ij}^{(m)}}$. In step 1704, $\mu_{ij,m}$ is assigned the value "0.2."

Figure 18:
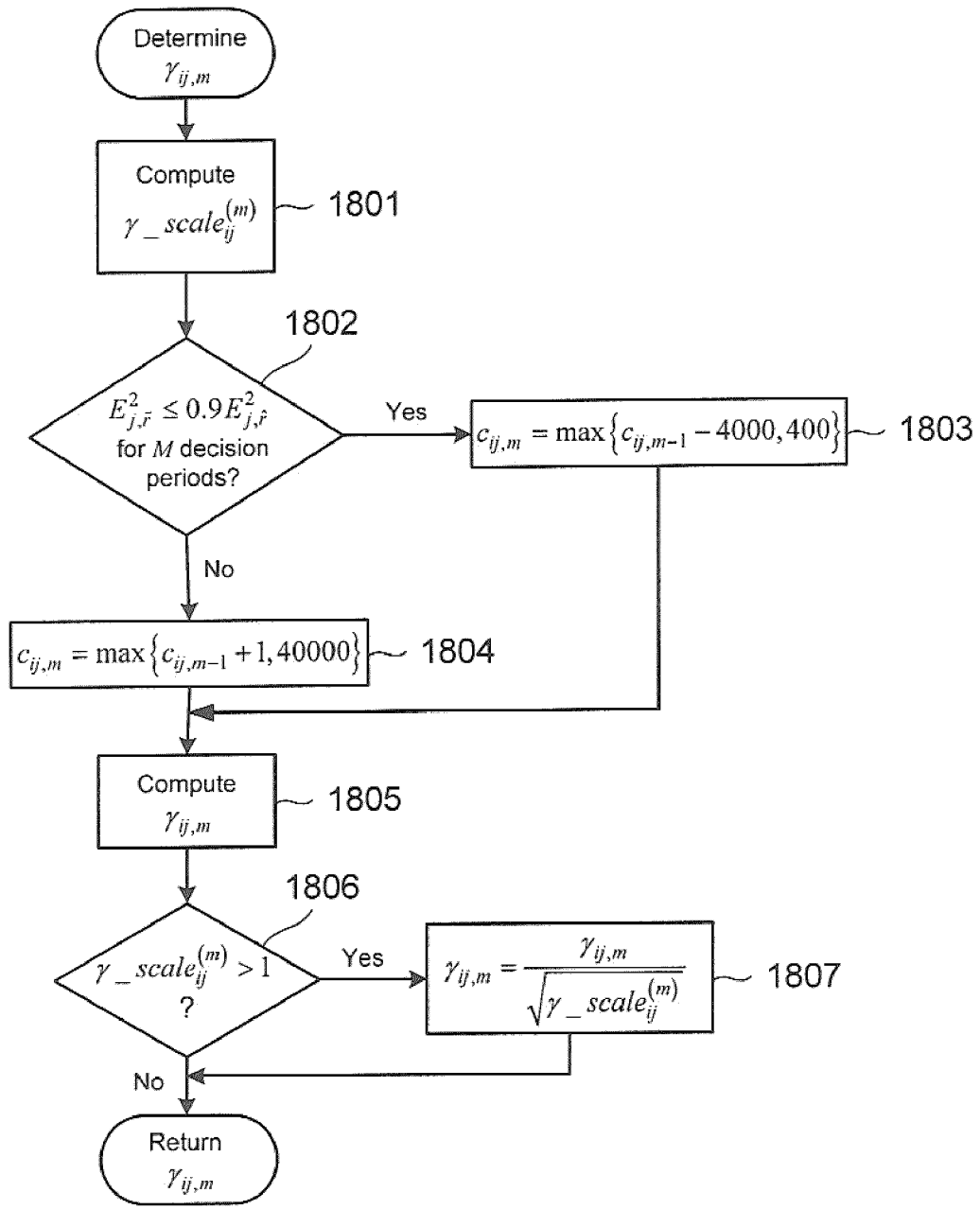
FIG. 18 is a control-flow diagram for the routine "determine $\gamma_{ij,m}$" called in step 1511 in FIG. 15 that represents an embodiment of the present invention.

FIG. 18 is a control-flow diagram for the routine "determine $\gamma_{ij,m}$" called in step 1511 in FIG. 15 that represents an embodiment of the present invention. In step 1801, a parameter $\gamma\_\text{scale}_{ij}^{(m)}$ is computed as follows:

$$\gamma\_\text{scale}_{ij}^{(m)} = \frac{\hat{\vec{h}}_{ij}^{(m)} \Lambda_{ij}^{-1(m)} (\hat{\vec{h}}_{ij}^{(m)})^T}{L}$$

In step 1802, when $E_{j,\tilde{r}}^2 \leq 0.9 E_{j,\tilde{r}}^2$ and after M time samples, control passes to step 1803, otherwise, control passes to step 1804. In step 1803, a parameter $c_{ij,m}$ is computed recursively as follows:

$$c_{ij,m} = \max\{c_{ij,m-1} - 4000, 400\}$$

In step 1804, the parameter $c_{ij,m}$ is computed recursively as follows:

$$c_{ij,m} = \max\{c_{ij,m-1} + 1, 40000\}$$

In step 1805, $\gamma_{ij,m}$ is assigned a value according to:

$$\gamma_{ij,m} = 5\left(\frac{v_{ij,m}}{v_{ij,m} + c_{ij,m}}\right)^{.85}$$

where $v_{ij,m}$ is computed in step 1602 of FIG. 16. In step 1806, when $\gamma\_\text{scale}_{ij}^{(m)}$ is greater than "1," control passes to step 1807. In step 1807, $\gamma_{ij,m}$ is assigned the value:

$$\gamma_{ij,m} = \frac{\gamma_{ij,m}}{\sqrt{\gamma\_\text{scale}_{ij}^{(m)}}}$$

Although the present invention has been described with respect to one embodiment, methods of the present invention are not limited to this embodiment. For example, in other embodiments of the present invention, acoustic echo cancellation may only be applied to a portion of the microphone digital signals. In particular, acoustic echo cancellation methods of the present invention may be applied to only those microphone-digital signals with amplitudes greater than some predetermined threshold rather than applying the method to all of the microphone-digital signals.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for reducing acoustic echoes in a plurality of microphone-digital signals sent from a near room to a far room using a computing device, the method comprising:
   calculating approximate impulse responses using the computing device, each approximate impulse response characterizes an echo path between a loudspeaker and a microphone in the near room, wherein the plurality of impulse responses lie within a model subspace of the space of possible impulse responses and wherein the dimensionality of the model subspace decreases over time by balancing errors associated with reducing the dimension of the model subspace with errors caused by observing noise as a function of reducing the dimensionality of the model subspace using the computing device; and
   calculating a controlled digital signal using the computing device, wherein the control digital signal is a function of at least one of the approximate impulse responses that lie within the model subspace, wherein the controlled digital signal is sent from the near room to the far room substantially free of acoustic echoes.

2. The method of claim 1 further comprising acquiring a first set of approximate impulse responses by changing the position of objects in the near room and sending training signals into microphones of the near room in order to obtain associated approximate impulse responses that are stored in a computer-readable medium of the computing device.

3. The method of claim 1 wherein calculating the plurality of approximate impulse response further comprises identifying a type of audio transmission associated with each echo path as one of the following:
   audio signals produced at the far room only;
   audio signals produced at the near room only;
   audio signals simultaneously produced at the near room and the far room; and
   no audio signals produced at either the near room or the far room.

4. The method of claim 1 wherein calculating the approximate-impulse-response as represented by an approximate-impulse-response vector $\hat{\vec{h}}_{ij}^{(m)}$ further comprises:

$$\hat{\vec{h}}_{ij}^{(m)} = \hat{\vec{h}}_{ij}^{(m-1)}$$

when no signals are transmitted between the near room and the far room or when signals are transmitted from the near room to the far room, where $\hat{\vec{h}}_{ij}^{(m-1)}$ is an approximate-impulse-response vector associated with a previous decision period identified by m−1, where m is an integer associated with a decision period.

5. The method of claim 1 wherein calculating the approximate-impulse-response vector further comprises when signals are simultaneously transmitted between the first location and the second location, selecting the approximate-impulse-response as represented by an approximate-impulse-response vector $\hat{\vec{h}}_{ij}^{(m)}$ from an impulse-response data structure with the K most recent approximate impulse responses with the highest signal to noise ratio $\{\hat{\vec{h}}_{ij}^{(m_1)}, \ldots, \hat{\vec{h}}_{ij}^{(m_k)}\}$.

6. The method of claim 5 wherein selecting the approximate-impulse-response vector $\hat{\vec{h}}_{ij}^{(m)}$ from the impulse response data structure further comprises selecting the approximate impulse-response based on one of:
   which impulse-response vector has the largest corresponding echo return loss enhancement value; and
   which approximate-impulse-response vector has been in the data structure the longest.

7. The method of claim 1 wherein calculating the approximate-impulse-response further comprises when signals are transmitted from the far room to the near room only employing a formula given by:

$$\hat{\vec{h}}_{ij}^{(m)} = (1-\gamma_{ij,m})\hat{\vec{h}}_{ij}^{(m-1)} + \gamma_{ij,m} U_{ij}^{T(m)} [U_{ij}^{T(m)} \hat{\vec{h}}_{ij}^{(m)}]$$

where $\hat{\vec{h}}_{ij}^{(m)}$ is a shadow-impulse-response vector associated with a decision period identified by m,
   $\hat{\vec{h}}_{ij}^{(m-1)}$ is an approximate-impulse-response vector associated with a previous decision period identified by m−1,
   $\gamma_{ij,m}$ is an impulse response step size, and
   $U_{ij}^{(m)}$ is a matrix determined by computing the singular value decomposition of the matrix $\Lambda_{ij}^{(m)}$ to obtain:

$$\Lambda_{ij}^{(m)} = [U_{ij}^{(m)} \ V_{ij}^{(m)}] \begin{bmatrix} \sum_{ij}^{(m)} & 0 \\ 0 & \Delta_{ij}^{(m)} \end{bmatrix} \begin{bmatrix} U_{ij}^{T(m)} \\ V_{ij}^{T(m)} \end{bmatrix}$$

in which the dimension of $U_{ij}^{(m)}$ is L×d such that L is the length of $\hat{\vec{h}}_{ij}$ and the singular values of $\Lambda_{ij}^{(m)}$ are ordered decreasingly as $$\lambda_1 \geq \lambda_2 \geq \ldots \geq \lambda_L$$

and the parameter d is obtained by:

$$d = \max\left\{\frac{L}{4}, \max\{k : \lambda_k \geq \alpha\lambda_1\}\right\}$$

for an arbitrary parameter $0 \leq \alpha \leq 1$.

8. The method of claim 7 wherein the shadow-impulse-response vector further comprises computing:

$$\vec{\tilde{h}}_{ij}^{(m)} = \vec{\tilde{h}}_{ij}^{(m-1)} \mu_{ij,m} \vec{\tilde{\epsilon}}_{ij}^{(m)}$$

where $\vec{\tilde{\epsilon}}_{ij}^{(m)}$ is a shadow-mismatch vector, $\vec{\tilde{h}}_{ij}^{(m-1)}$ is a shadow-impulse-response vector associated with a previous decision period identified by m−1, and where $\mu_{ij,m}$ is a shadow update step size.

9. The method of claim 8 wherein the shadow-mismatch vector further comprises computing:

$$\vec{\tilde{\epsilon}}_{ij}^{(m)} = Tr_L \cdot \text{IFFT}\{\vec{Q}_j^{(m)} \circ \vec{X}_i^{(m)} \circ (\vec{\tilde{R}}_j^{(m)})^*\}$$

where m is an integer associated with a decision period,

L is a number of vector components,

IFFT is the inverse Fourier transform operator, $Tr_L$ is a truncation operator of size L, $\vec{Q}_j^{(m)}$ is a frequency domain, preconditioning operator, $\vec{X}_i^{(m)}$ is a frequency domain vector corresponding to the audio signal, and $\vec{\tilde{R}}_j^{(m)}$ is a frequency domain, shadow error vector.

10. The method of claim 7 wherein $U_{ij}^{(m)}$ is determined by computing the singular value decomposition of the matrix $\Lambda_{ij}^{(m)}$ further comprises computing:

$$\Lambda_{ij}^{(m)} = \frac{m-1}{m}\Lambda_{ij}^{(m-1)} + \frac{1}{m}\hat{h}_{ij}^{(m-1)}(\hat{h}_{ij}^{(m-1)})^T$$

where m in is an integer associated with a decision period, $\Lambda_{ij}^{(m-1)}$ is a matrix associated with a previous decision period identified by in m−1, and $\hat{\vec{h}}_{ij}^{(m-1)}$ is an approximate-impulse-response vector associated with a previous decision period identified by in m−1.

11. The method of claim 1 wherein reducing dimensionality of the model subspace based by balancing errors associated with reducing the dimension of the model subspace with errors caused by observing noise as a function of reducing the dimensionality of the model subspace further comprises an upper bound on the errors associated with reducing the dimension of the model subspace as follows:

$$C_{app}(\rho) \triangleq 2(1 - Q(\rho))tr(\Lambda)\left(1 + tr((A^TA)^{-1}\rho)\right)$$

where tr($\Lambda$) of the eigenvalues of the singular value decomposition of $$\Lambda = \frac{1}{N}\sum_{i,j} \hat{h}_{ij}\hat{h}_{ij}^T;$$

A is the matrix of microphone signals;

$$\rho = \frac{d}{D}$$

with d equal to the dimension of the model subspace and D the dimension of the space of impulse responses for the near room, such that d<D; and $$Q(\rho) = \frac{\sum_{i=1}^{\lfloor \rho D \rfloor} \lambda_i}{\sum_{i=1}^{D} \lambda_i}$$

with $\lambda_i$ denoting the i-th largest eigenvalue of the singular value decomposition of $\Lambda$.

12. The method of claim 1 wherein reducing dimensionality of the model subspace based by balancing errors associated with reducing the dimension of the model subspace with errors caused by observing noise as a function of reducing the dimensionality of the model subspace further comprises an upper bound on the errors caused by observing noise as a function of reducing the dimensionality of the model subspace as follows:

$$C_{est}(\rho) \triangleq 2\frac{\chi(A^TA)}{\gamma D}\rho$$

where

A is the matrix of microphone signals sent to the near room;

$\gamma$ is the signal to noise ratio;

$$\rho = \frac{d}{D}$$

with d equal to the dimension of the model subspace and D the dimension of the space of impulse responses for the near room, such that d<D; and $\chi(A^TA)$ is a lower bound of a condition number, which is a ratio of maximum eigenvalues to minimum eigenvalues.

13. The method of claim 1 wherein calculating a reduced dimensionality of the model subspace further comprises calculating an optimal dimension such that the number of eigenvalues of the singular value decomposition of:

$$\Lambda = \frac{1}{N}\sum_{i,j} \hat{h}_{ij}\hat{h}_{ij}^T$$

are larger than the cutoff threshold:

$$\eta \triangleq \frac{\chi(A^TA)}{\gamma D^2}$$

where $\chi(A^T A)$ is a lower bound of a condition number, which is a ratio of maximum eigenvalues to minimum eigenvalues;

D the dimension of the space of impulse responses for the near room; and $\gamma$ is the signal to noise ratio.

14. The method of claim 1 wherein calculating the controlled digital signal further comprises calculating:

$$\hat{\vec{r}}_j^{(m)}[n] = Tr_{N_d} \cdot IFFT\left\{\vec{Y}_j^{(m)} - \sum_{i=1}^{I} \vec{X}_i^{(m)} \cdot (\hat{\vec{H}}_{ij}^{(m-1)})^*\right\}$$

where
- $j \in \{1, \ldots J\}$ is a microphone index,
- $i \in \{1, \ldots, I\}$ is a loudspeaker index,
- $Tr_{N_d}$ is a truncation operator of a decision period length $N_d$,
- IFFT is inverse Fast-Fourier transform,
- "∘" represents component-wise multiplication of two vectors,
- $\vec{Y}_j^{(m)}$ is a frequency domain microphone-digital signal,
- $\vec{X}_i^{(m)}$ is a frequency domain digital signal,
- $\hat{\vec{H}}_{ij}^{(m)} = FFT\{\hat{\vec{h}}_{ij}^{(m)}\}$ is a frequency domain, approximate-impulse-response vector, and $$\sum_{i=1}^{I} \vec{X}_i^{(m)} \cdot (\hat{\vec{H}}_{ij}^{(m-1)})^*$$

is frequency domain, approximate acoustic echo.

15. The method of claim 14 wherein $$\hat{\vec{H}}_{ij}^{(m)} = FFT\{\hat{\vec{h}}_{ij}^{(m)}\}$$

further comprises computing $\hat{\vec{h}}_{ij}^{(m)}$ as an approximate impulse response vector corresponding to an echo path between an ith microphone and a jth loudspeaker that lies within the model subspace.

16. A system for reducing acoustic echoes in a plurality of microphone-digital signals transmitted from a near room to a far room, wherein the near room includes a plurality of loudspeakers and a plurality of microphones, the system comprising:
- a computing device comprising a processor and memory; and
- a computer program that
  - calculates approximate impulse responses using the computing device, each approximate impulse response characterizes an echo path between a loudspeaker and a microphone in the near room, wherein the plurality of impulse responses lie within a model subspace of the space of possible impulse responses, and wherein the dimensionality of the model subspace decreases over time by balancing errors associated with reducing the dimension of the model subspace with errors caused by observing noise as a function of reducing the dimensionality of the model subspace using the computing device; and
  - calculates a controlled digital signal using the computing device, wherein the controlled digital signal is a function of at least one of the approximate impulse responses that lies within the model subspace and is sent from the near room to the far room substantially free of acoustic echoes.

17. The method of claim 16 wherein calculates the approximate impulse response further comprises identifies the type of audio transmission associated with each acoustically coupled loudspeaker and microphone further comprises:
- determines whether audio signals are produced at the first location only;
- determines whether audio signals are produced at the second location only;
- determines whether audio signals are simultaneously produced at the first location and the second location; and
- determines whether no audio signals are produced at either the first location or the second location.

18. The method of claim 16 wherein calculates the controlled digital signal further comprises:

$$\hat{\vec{r}}_j^{(m)}[n] = Tr_{N_d} \cdot IFFT\left\{\vec{Y}_j^{(m)} - \sum_{i=1}^{I} \vec{X}_i^{(m)} \cdot (\hat{\vec{H}}_{ij}^{(m-1)})^*\right\}$$

where
- $j \in \{1, \ldots J\}$ is a microphone index,
- $i \in \{1, \ldots, I\}$ is a loudspeaker index,
- $Tr_{N_d}$ is a truncation operator of a decision period length $N_d$,
- IFFT is inverse Fast-Fourier transform,
- "∘" represents component-wise multiplication of two vectors,
- $\vec{Y}_j^{(m)}$ is a frequency domain microphone-digital signal,
- $\vec{X}_i^{(m)}$ is a frequency domain digital signal,
- $\hat{\vec{H}}_{ij}^{(m-1)}$ is a frequency domain, approximate-impulse-response vector, and $$\sum_{i=1}^{I} \vec{X}_i^{(m)} \cdot (\hat{\vec{H}}_{ij}^{(m-1)})^*$$

is frequency domain, approximate acoustic echo.

19. A method for reducing acoustic echoes in a plurality of microphone-digital signals sent from a near room to a far room using a computing device, the method comprising:
- calculating a plurality of approximate impulse responses using the computing device, each approximate impulse response characterizes an echo path between a loudspeaker and a microphone in the near room, wherein the plurality of approximate impulse responses lie within a d-dimensional linear manifold subspace $\mathcal{M}$ of the space of possible impulse responses $\mathbb{R}^D$ such that $\mathcal{M}$ is embedded in $\mathbb{R}^D$ and d<D, and wherein dimensionality d decreases over time by balancing an approximation error with an estimation error; wherein the approximation error is a measure of between the d-dimensional linear manifold subspace $\mathcal{M}$ and an approximated linear manifold $\hat{\mathcal{M}}$ by data set of noisy samples and the estimation error is a measure of deviation due to additive noise and the ill-conditioning of a matrix of microphone signals received by the computing device.

20. The method of claim 19, in which, as the dimensionality d increases, the estimation error decreases linearly and the approximation error drops super-linearly.

* * * * *

UNITED STATES PATENT AND TRADEMARK OFFICE
CERTIFICATE OF CORRECTION

PATENT NO. : 8,208,649 B2
APPLICATION NO. : 12/387075
DATED : June 26, 2012
INVENTOR(S) : Majid Fozunbal et al.

It is certified that error appears in the above-identified patent and that said Letters Patent is hereby corrected as shown below:

In the Specification

In column 8, line 52, after ""0."" insert -- Convolution may also be denoted by $\bar{h}_n * x[n]$. --.

In column 16, line 64, after "approximation" insert -- error, whereas the --.

In the Claims

In column 31, line 43, in Claim 1, delete "responses" and insert -- responses, --, therefor.

In column 33, line 3, in Claim 8, delete " $\vec{h}_{ij}^{(m)} = \vec{h}_{ij}^{(m-1)} \mu_{ij,m} \vec{e}_{ij}^{(m)}$ " and insert -- $\vec{h}_{ij}^{(m)} = \vec{h}_{ij}^{(m-1)} + \mu_{ij,m} \vec{e}_{ij}^{(m)}$ --, therefor.

In column 33, line 9, in Claim 8, before " $\mu_{ij,m}$ " delete "where".

In column 33, line 16, in Claim 9, delete "Fourier" and insert -- Fast-Fourier --, therefor.

In column 33, line 31, in Claim 10, delete "in is" and insert -- is --, therefor.

In column 33, line 33, in Claim 10, delete "by in" and insert -- by --, therefor.

In column 33, line 36, in Claim 10, delete "by in" and insert -- by --, therefor.

In column 36, line 55, in Claim 20, delete "by" and insert -- defined by --, therefor.

Signed and Sealed this
Eleventh Day of June, 2013

Teresa Stanek Rea
*Acting Director of the United States Patent and Trademark Office*